(12) United States Patent
Silin et al.

(10) Patent No.: US 12,269,625 B2
(45) Date of Patent: Apr. 8, 2025

(54) UAV PARACHUTE DEPLOYMENT SYSTEMS AND METHODS USING A ROTOR GUARD

(71) Applicant: FLIR Unmanned Aerial Systems ULC, Vancouver (CA)

(72) Inventors: Dmytro Silin, Waterloo (CA); Albert Pegg, Waterloo (CA)

(73) Assignee: FLIR Unmanned Aerial Systems ULC, Vancouver (CA)

( * ) Notice: Subject to any disclaimer, the term of this patent is extended or adjusted under 35 U.S.C. 154(b) by 0 days.

(21) Appl. No.: 18/186,758

(22) Filed: Mar. 20, 2023

(65) Prior Publication Data

US 2023/0294853 A1     Sep. 21, 2023

Related U.S. Application Data

(63) Continuation of application No. PCT/US2021/052726, filed on Sep. 29, 2021.
(Continued)

(51) Int. Cl.
*B64U 70/83*     (2023.01)
*B64D 17/62*     (2006.01)
(Continued)

(52) U.S. Cl.
CPC ............. *B64U 70/83* (2023.01); *B64D 17/62* (2013.01); *B64U 30/26* (2023.01); *B64U 2101/30* (2023.01)

(58) Field of Classification Search
CPC .................... B64D 17/80; B64U 70/83
See application file for complete search history.

(56) References Cited

U.S. PATENT DOCUMENTS

| 1,019,858 A | * | 3/1912 | Tanner | B64D 17/80 244/147 |
| 1,072,764 A | * | 9/1913 | Nagel | B64D 17/80 244/147 |

(Continued)

FOREIGN PATENT DOCUMENTS

| CN | 104118564 | 1/2016 |
| CN | 107031849 | 8/2017 |

(Continued)

OTHER PUBLICATIONS https://www.indemnis.com/, Drone Rescue Parachute System.

*Primary Examiner* — Joseph W Sanderson
(74) *Attorney, Agent, or Firm* — Haynes and Boone, LLP

(57) ABSTRACT

Rescue parachute deployment systems (RPDSs) and related techniques are provided to improve the safety and operational flexibility of unmanned aerial vehicles (UAVs). An RPDS includes a canopy assembly, a rotor guard disposed at least partially about the canopy assembly and configured to protect the canopy assembly from rotor strike damage as the canopy assembly is launched through a rotor plane of the UAV, and an ejector assembly configured to deploy the rotor guard into and the canopy assembly through a rotor plane of the UAV. The RPDS may also include a logic device coupled to and/or integrated with the ejector assembly and/or the UAV that is configured to determine a rescue parachute launch condition is active and to control the ejector assembly to deploy the canopy assembly through the rotor plane of the UAV.

20 Claims, 12 Drawing Sheets

Related U.S. Application Data

(60) Provisional application No. 63/086,044, filed on Sep. 30, 2020.

(51) Int. Cl.
 *B64U 30/26* (2023.01)
 *B64U 101/30* (2023.01)

(56) References Cited

U.S. PATENT DOCUMENTS

| | | | |
|---|---|---|---|
| 2,972,457 A * | 2/1961 | Augustus | B64D 17/80 244/113 |
| 4,648,568 A | 3/1987 | Phillips | |
| 4,659,041 A | 4/1987 | Dellinger et al. | |
| 6,685,140 B2 | 2/2004 | Carroll | |
| 9,611,045 B2 | 4/2017 | Erickson et al. | |
| 9,694,910 B2 * | 7/2017 | MacCallum | B64B 1/02 |
| 9,889,941 B1 | 2/2018 | Erickson et al. | |
| 10,053,217 B2 * | 8/2018 | Cho | B64U 50/38 |
| 10,059,459 B2 | 8/2018 | Clark et al. | |
| 10,112,721 B2 | 10/2018 | Sweeny et al. | |
| 10,202,198 B2 | 2/2019 | Babovka et al. | |
| 10,351,249 B2 | 7/2019 | Mitchell et al. | |
| 11,142,325 B2 * | 10/2021 | Manninger | B64D 17/54 |
| 11,260,981 B2 * | 3/2022 | Bachmann | B64C 39/024 |
| 2007/0272801 A1 * | 11/2007 | Hilliard | B64D 17/025 244/142 |
| 2016/0009392 A1 | 1/2016 | Korhonen et al. | |
| 2016/0272317 A1 * | 9/2016 | Cho | B64U 50/38 |
| 2016/0318615 A1 * | 11/2016 | Pick | B64D 17/54 |
| 2017/0225792 A1 * | 8/2017 | Wang | B64C 39/024 |
| 2019/0138005 A1 | 5/2019 | Wigell | |
| 2019/0315474 A1 * | 10/2019 | Manninger | B64D 17/80 |
| 2020/0255157 A1 * | 8/2020 | Bachmann | B64D 17/64 |
| 2022/0001994 A1 * | 1/2022 | Chen | B64D 17/72 |

FOREIGN PATENT DOCUMENTS

| | | |
|---|---|---|
| CN | 111232221 | 6/2020 |
| DE | 202013000537 | 2/2013 |
| DE | 202017001485 U1 * | 8/2018 |
| EP | 2838793 | 2/2015 |
| FR | 2772340 | 6/1999 |
| WO | WO 2016/025444 | 2/2016 |
| WO | WO 2019/127351 | 7/2019 |

* cited by examiner

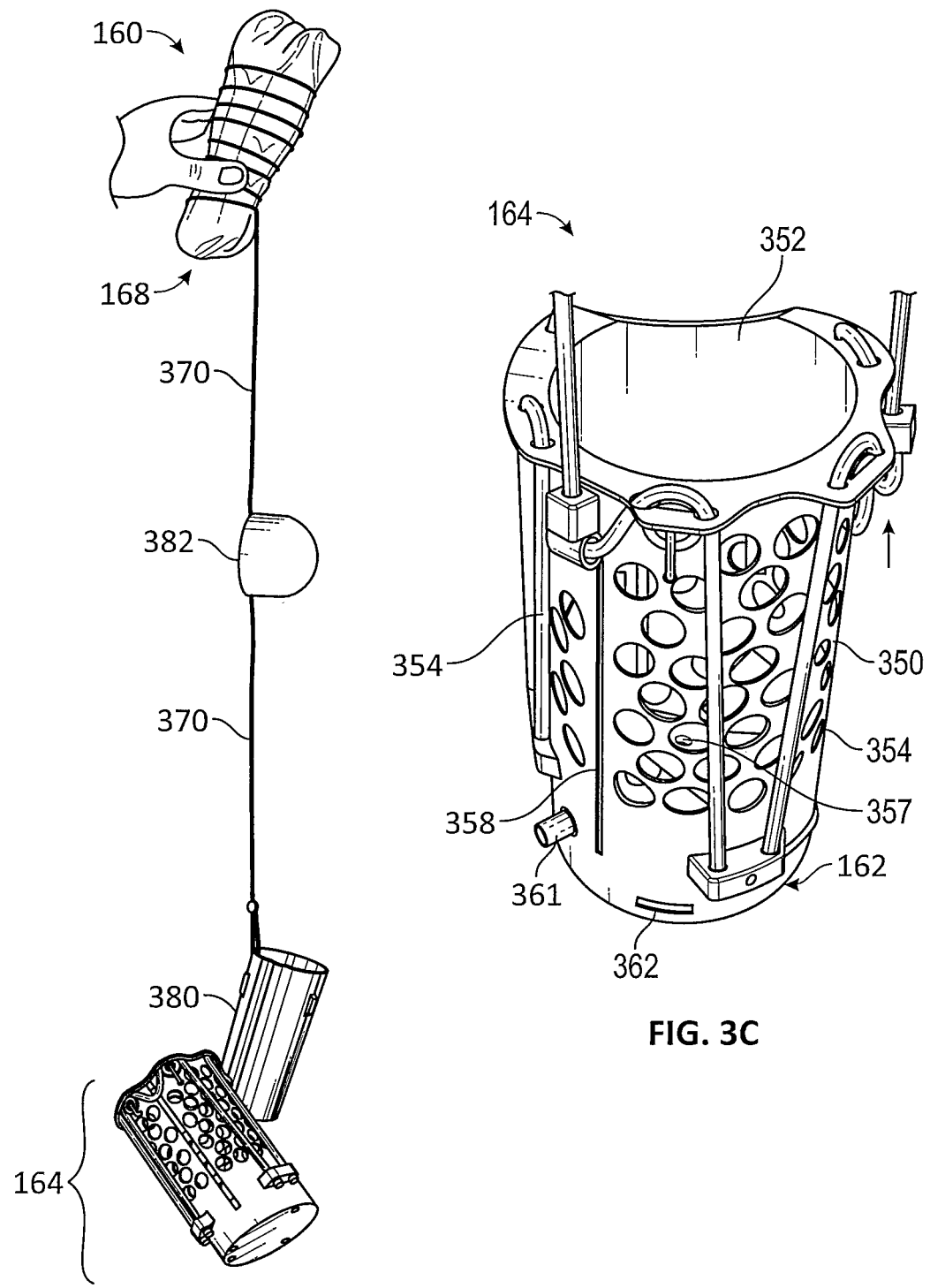

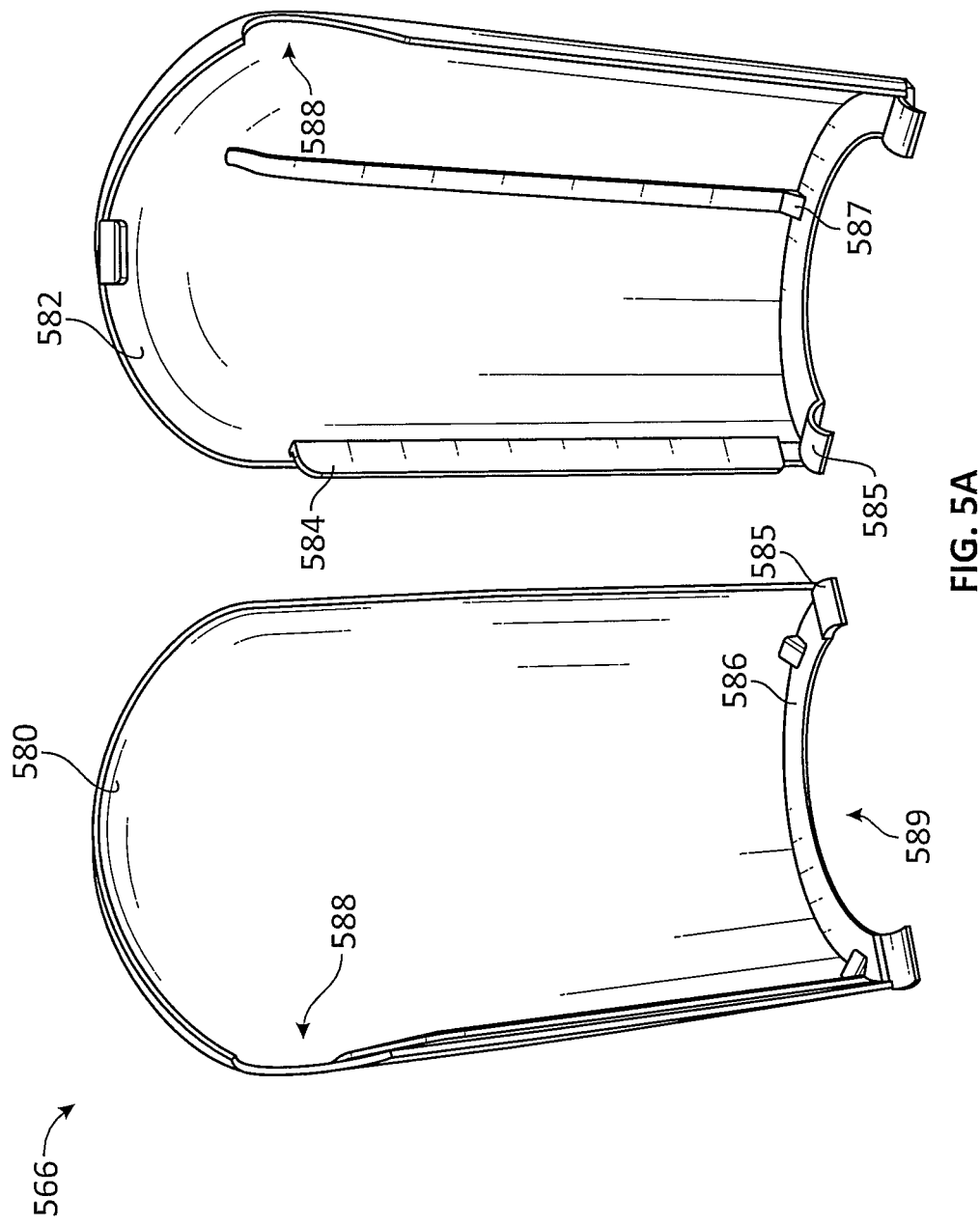

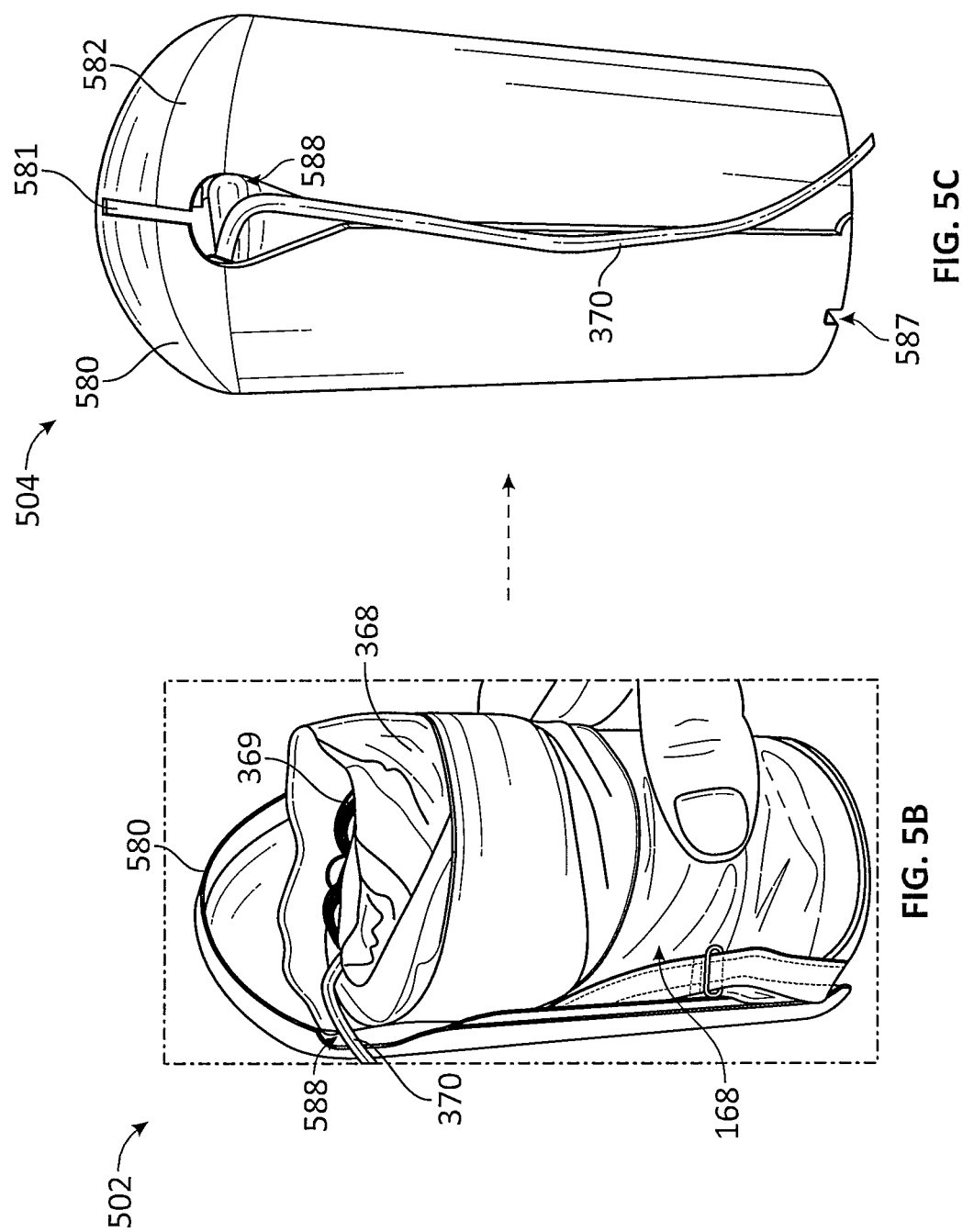

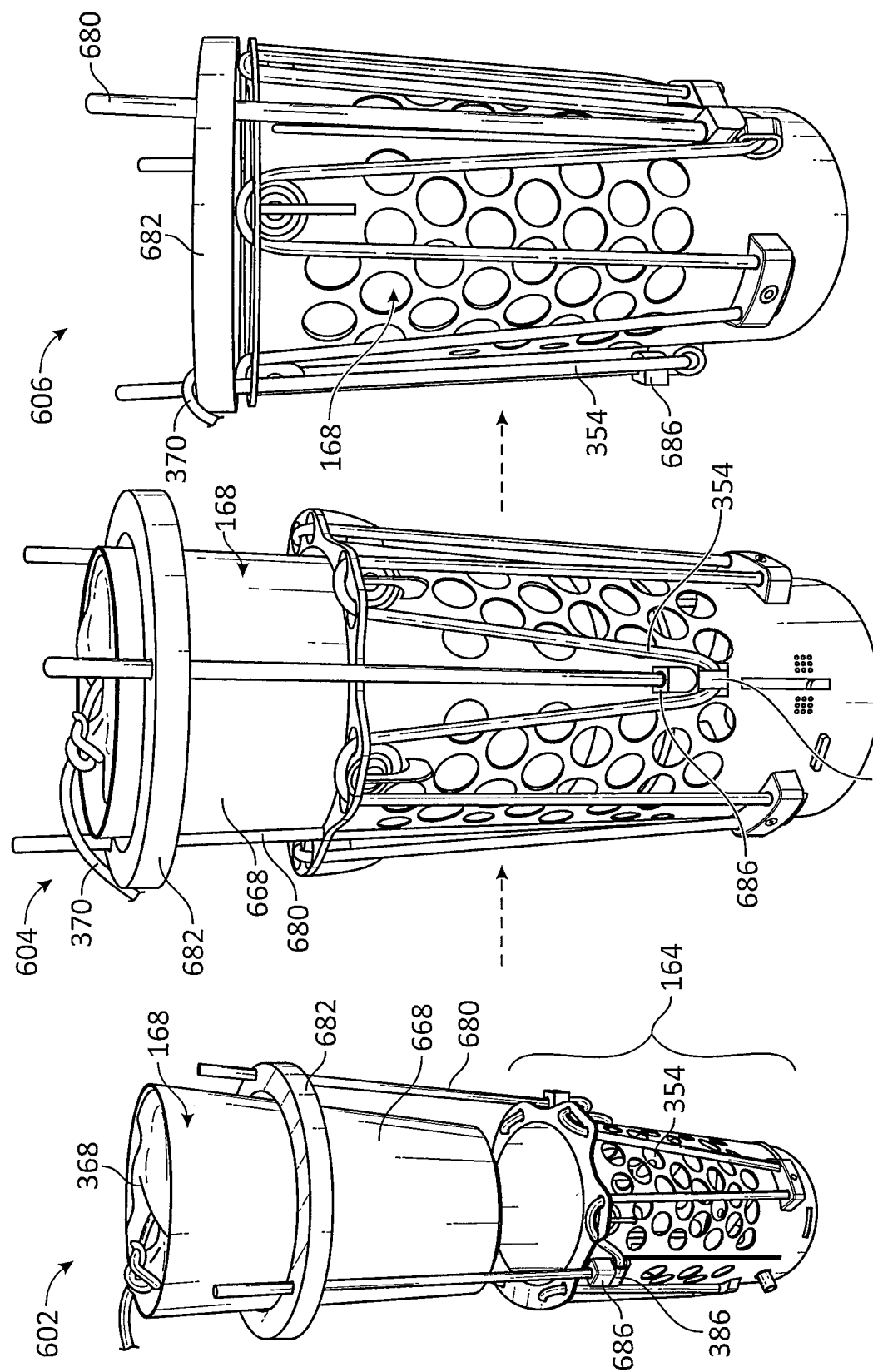

UAV PARACHUTE DEPLOYMENT SYSTEMS AND METHODS USING A ROTOR GUARD

CROSS-REFERENCE FOR RELATED APPLICATIONS

This application is a continuation of International Patent Application No. PCT/US2021/052726 filed Sep. 29, 2021 and entitled "UAV PARACHUTE DEPLOYMENT SYSTEMS AND METHODS," which claims priority to and the benefit of U.S. Provisional Patent Application No. 63/086,044 filed Sep. 30, 2020 and entitled "UAV PARACHUTE DEPLOYMENT SYSTEMS AND METHODS," all of which are incorporated herein by reference in their entirety.

TECHNICAL FIELD

The present invention relates generally to parachute deployment and, more particularly, to systems and methods for rescue parachute deployment by relatively lightweight unmanned aircraft.

BACKGROUND

Modern unmanned aircraft systems (UASs), which may include one or a variety of different unmanned aerial vehicles (UAVs), are often expected to operate over long distances and in all types of environments; rural, urban, and over other populated and/or unpopulated areas. Operation of systems incorporating such unmanned flight platforms may include real-time wireless transmissions between the platform and a remote base station, which may itself include a display to efficiently convey telemetry, imagery, and/or other sensor data captured by the platform to an operator. An autopilot or an operator may pilot or otherwise assist in or guide control of an unmanned flight platform throughout an entire mission relying solely on received data provided by the unmanned platform.

Flight of a UAV over populated land and/or structures is increasingly regulated and may require installation of safety measures designed to reduce and/or eliminate risk of damage to person and property as a result of a platform navigation crisis, including loss of propulsion power. Moreover, UAVs are increasingly used to provide a variety of transport and/or delivery services, including transport of relatively expensive sensors for environmental survey and monitoring, for example, and/or transport and delivery of medicine and other relatively fragile cargo. Such safety measures can also be leveraged to reduce and/or eliminate risk of damage to the UAV, and any package or sensor suite coupled to the UAV, as a result of a platform navigation crisis. One safety measure addressing both operational needs is a rescue parachute, but conventional parachute deployment systems are too easily damaged or otherwise rendered inoperable by a typical UAV propulsion system and/or otherwise lack sufficiently reliable performance. Thus, there is a need for rescue parachute deployment systems and techniques for use with UASs to provide relatively reliable and high-performance countermeasures to a variety of UAV navigation crises.

SUMMARY

Unmanned aerial vehicle (UAV) rescue parachute deployment systems (RPDSs) and related techniques are provided to improve the operation of unmanned flight platforms. One or more embodiments of the described UAV RPDSs may advantageously include a canopy assembly, an ejector assembly, and a rotor guard configured to protect the canopy assembly as it is launched by the ejector assembly through a rotor plane of the UAV. Embodiments may also include an orientation and/or position sensor to measure dynamic motion of the RPDS, a deployment controller to control operation of the system, and one or more additional sensors to measure and provide sensor data corresponding to maneuvering and/or other operation of the flight platform and/or the RPDS. In various embodiments, such additional sensors may include one or more visible spectrum and/or infrared cameras and/or other remote sensor systems coupled to the flight platform.

In one embodiment, a system includes a canopy assembly including a bundled canopy coupled to the RPDS and/or the UAV via a shock cord and a plurality of suspension lines; a rotor guard disposed at least partially about the canopy assembly and configured to protect the canopy assembly from rotor strike damage as the canopy assembly is launched through a rotor plane of the UAV; and an ejector assembly including a launch platform and/or a plurality of launch impulse interfaces configured to deploy the rotor guard into and the canopy assembly through a rotor plane of the UAV. The system may also include a logic device coupled to and/or integrated with the ejector assembly and/or the UAV. The logic device may be configured to determine a rescue parachute launch condition is active and to control the ejector assembly to deploy the canopy assembly through the rotor plane of the UAV.

In another embodiment, a method includes determining a rescue parachute launch condition for a UAV is active and controlling an ejector assembly of an RPDS coupled to the UAV to deploy a rotor guard into and a canopy assembly through a rotor plane of the UAV. The canopy assembly may include a bundled canopy coupled to the RPDS and/or the UAV via a shock cord and a plurality of suspension lines, and the rotor guard may be disposed at least partially about the canopy assembly and configured to protect the canopy assembly from rotor strike damage as the canopy assembly is launched through the rotor plane of the UAV.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 3B illustrates a diagram of a UAV rescue parachute deployment system in accordance with an embodiment of the disclosure.

FIG. 3C illustrates a diagram of an ejector assembly for a UAV rescue parachute deployment system in accordance with an embodiment of the disclosure.

FIG. 5A illustrates a diagram of a rotor guard for a UAV rescue parachute deployment system in accordance with an embodiment of the disclosure.

FIGS. 5B-C illustrate diagrams of the rotor guard of FIG. 5A disposed about a canopy assembly for a UAV rescue parachute deployment system in accordance with embodiments of the disclosure.

FIGS. 6B-D illustrate diagrams of a UAV rescue parachute deployment system employing the rotor guard of FIG. 6A, in accordance with embodiments of the disclosure.

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
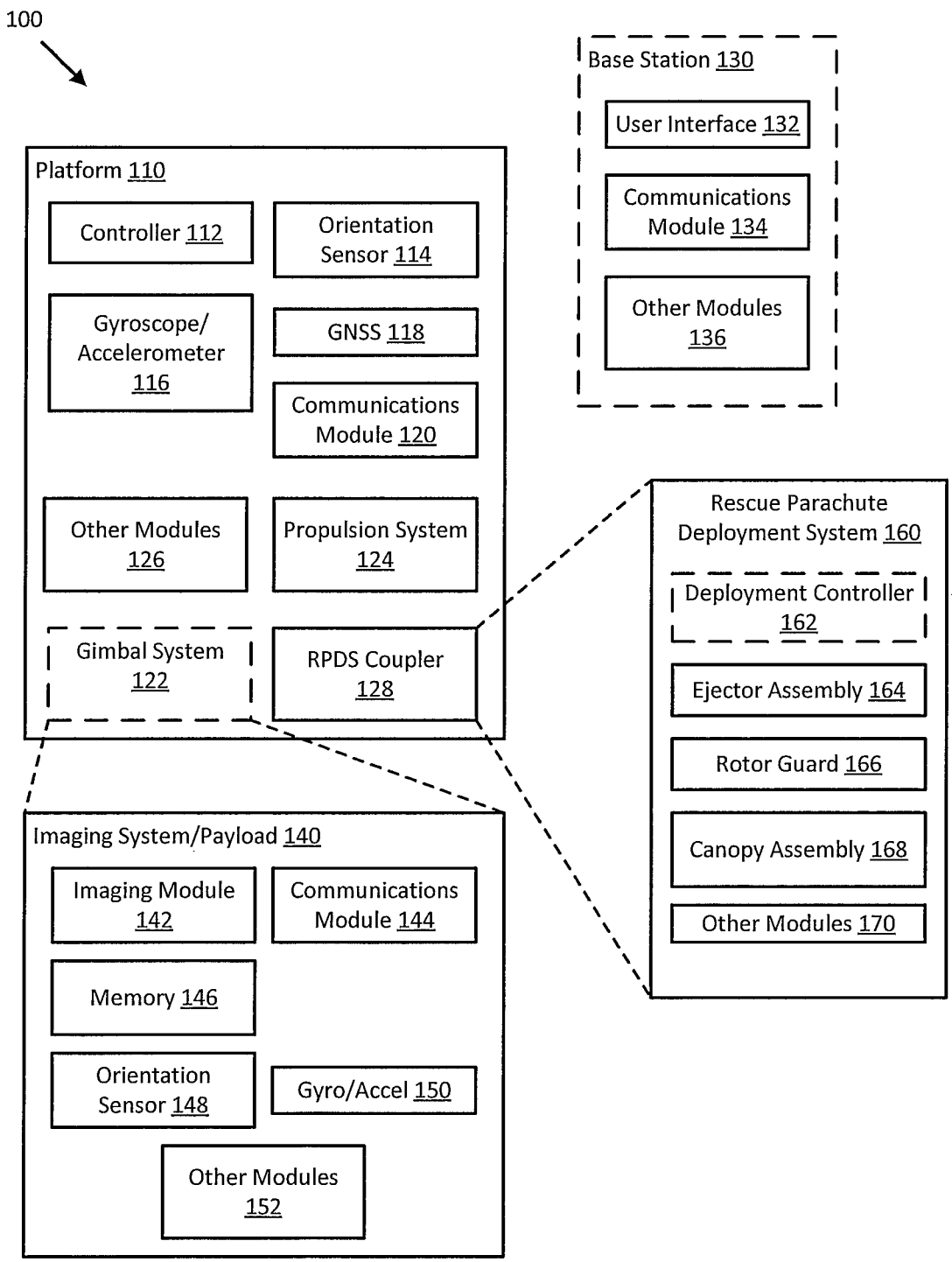
FIG. 1 illustrates a block diagram of an unmanned aircraft system (UAS) including an unmanned aerial vehicle (UAV) rescue parachute deployment system in accordance with an embodiment of the disclosure.

Modern unmanned aerial vehicles (UAVs) are able to operate over long distances and in all environments. High efficiency propulsion systems for UAVs can require large diameter propellers or rotors, and compact arrangement of vertically aligned large diameter rotors about a UAV airframe can leave very little if any space for other components that require or at least benefit from up-facing installation, such as global navigation satellite system (GNSS) antennas (e.g., to provide as unobscured and as large a sky view as possible) and rescue parachute deployment systems (e.g., to provide the most expedient countermeasure to the most common UAV navigational crises). Embodiments described herein address the conflicting operational needs of UAV propulsion systems and rescue parachute deployment systems (RPDSs).

For example, embodiments of the RPDSs described herein may include a relatively rigid rotor guard disposed about the primary rescue parachute/canopy assembly (e.g., canopy, support lines, shock cord) that allows the RPDS to be mounted beneath a 'copter-type UAV's rotor plane or disk (e.g., the area(s) swept through by the UAV's rotors) and to launch the canopy assembly through the UAV's rotor disk reliably and without risking damage to the canopy assembly (e.g., in the event the UAV's rotors are rotating at a significant RPM when the canopy assembly is launched). Advantageously, such RPDS mounting is also beneath a typical UAV GNSS antenna's operational field of view (e.g., a dome aligned with a vertical axis of the UAV), which allows the RPDS to deploy a rescue parachute vertically upward without interfering with operation of the GNSS and/or over-utilizing the typically limited area above the UAV that is unobstructed by rotors, navigation sensors, cameras, aerodynamic features, and/or other elements of the UAV.

Embodiments therefore provide systems and methods to deploy rescue parachutes in UAVs, where the canopy of the rescue parachute, and its connection to the UAV, are protected while they are deployed through the UAV's rotor disk(s). As a result, embodiments described herein can be safety installed on the UAV where conventional systems would otherwise interfere with other parts of the UAV or cannot be installed at all. Moreover, embodiments are able to deploy rescue parachutes in a manner that can reduce and/or arrest undesired momentum of a coupled UAV more quickly than systems unable to deploy safely through a UAV's rotor disk(s).

In some embodiments, an RPDS may include a capsule-shaped rotor guard (e.g., parachute container) implemented by two interlocking half-capsule shells each including a smooth/aerodynamic half-dome-shaped top and half-cylindrical body shaped to provide a shock cord orifice for a canopy shock chord when the two half-capsule shells are interlocked with the canopy assembly disposed within. Each half-capsule shell may be made of relatively thin but strong plastic, such as polyethylene terephthalate (PET) (e.g., commonly used for carbonated drink bottles), which may be used to form each half-capsule shell by injection molding, 3d printing, and/or other plastic shell formation techniques. In such embodiments, the combination of the relatively thin and rigid interlocking shell with a tightly folded and/or rolled canopy assembly (e.g., working as internal cushioning) provides an impact resistant solution.

In related embodiments, an RPDS may include a capsule-shaped rotor guard implemented by a tapered cylindrical body or cup and a dome-shaped lid. The tapered cylindrical body and the dome-shaped lid may each be formed using materials and techniques similar to those used to form the two half-capsule shells described herein, for example, and may be formed according to similar thicknesses/rigidity characteristics. Such embodiments may include vent holes for pressure relief during parachute deployment and may include various spacer ribs and/or other alignment features to space the rotor guard from an ejector assembly of the RPDS to help ensure reliable launch of the rescue parachute even in relatively poor environmental conditions, such as those conducive to ice formation in narrow gaps.

In further embodiments, an RPDS may include a rotor guard implemented by a guard ring and a plurality of guide rods coupled to each other through the guard ring and configured to protect the canopy assembly from impact damage as the canopy assembly and the rotor guard are launched by the RPDS's ejector assembly. Each guide rod can absorb and stop or deflect impacts from rotors, and the guard ring may be configured to connect all the pushrods and form them into a relatively rigid frame. Connecting the guide rods into a frame adds structural rigidity and prevents the rotor guard from losing its shape and jamming during deployment and rotor impacts. In various embodiments, the rotor guard may be packed into a disposable water- and UV-resistant pouch before being loaded into the ejector assembly of an RPDS. During deployment, the pouch may be pierced and opened by the top ends of guide rods, as described herein.

FIG. 1 illustrates a block diagram of an unmanned aircraft system (UAS) 100 including an unmanned aerial vehicle (UAV) rescue parachute deployment system (RPDS) 160 coupled to a UAV platform 110 in accordance with an embodiment of the disclosure. In some embodiments, system 100 may be configured to fly over a scene, through a structure, or approach a target and image or sense the scene, structure, or target, or portions thereof, using gimbal system 122 to aim imaging system/sensor payload 140 at the scene, structure, or target, or portions thereof. Resulting imagery and/or other sensor data may be processed (e.g., by sensor payload 140, platform 110, and/or base station 130) and displayed to a user through use of user interface 132 (e.g., one or more displays such as a multi-function display (MFD), a portable electronic device such as a tablet, laptop, or smart phone, or other appropriate interface) and/or stored in memory for later viewing and/or analysis.

In various embodiments, system 100 may be configured to use such imagery and/or sensor data to control operation of platform 110 and/or sensor payload 140, as described herein, such as controlling gimbal system 122 to aim sensor payload 140 towards a particular direction or controlling propulsion system 124 to move platform 110 to a desired position in a scene or structure or relative to a target. In related embodiments, system 100 may be configured to deliver or drop a package (e.g., payload 140) at a desired location or structure or relative to a target. In all operational embodiments, system 100 may be configured to use such imagery and/or related sensor data to detect a UAV navigation crisis, such as unintended inverted flying, pitch and/or roll attitudes outside preselected safety ranges, unintended loss of altitude, entrance into an altitude or otherwise restricted airspace, and/or loss of power, for example, and to use RPDS 160 to deploy a rescue parachute (e.g., canopy assembly 164) to cause platform 110 and/or payload 140 to safety descend to the ground without damaging platform 110, payload 140, other elements of system 100, and/or underlying persons or property, as described herein.

In the embodiment shown in FIG. 1, UAS 100 includes platform 110, optional base station 130, and at least one RPDS 160. In general, platform 110 may be a mobile platform configured to move or fly and position payload 140 and/or platform 110 (e.g., relative to a designated or detected target). As shown in FIG. 1, platform 110 may include one or more of a controller 112, an orientation sensor 114, a gyroscope/accelerometer 116, a global navigation satellite system (GNSS) 118, a communications module 120, a gimbal system 122, a propulsion system 124, a RPDS coupler 128, and other modules 126. Sensor payload 140 and/or RPDS 160 may be physically coupled to platform 110 and be configured to capture sensor data (e.g., visible spectrum images, infrared images, narrow aperture radar data, analyte sensor data, orientation/attitude and/or position data, and/or other sensor data) of a target position, area, and/or object(s) as selected and/or framed by operation of platform 110 and/or base station 130, for example, and/or associated with maneuvering or navigation of platform 110, as described herein.

Operation of platform 110 may be substantially autonomous and/or partially or completely controlled by optional base station 130, which may include one or more of a user interface 132, a communications module 134, and other modules 136. In other embodiments, platform 110 may include one or more of the elements of base station 130, such as with various types of manned aircraft, terrestrial vehicles, and/or surface or subsurface watercraft. In some embodiments, one or more of the elements of system 100 may be implemented in a combined housing or structure that can be coupled to or within platform 110 and/or held or carried by a user of system 100.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of platform 110 and/or other elements of system 100, for example. Such software instructions may also implement methods for processing infrared images and/or other sensor signals, determining sensor information, providing user feedback (e.g., through user interface 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user using user interface 132. In some embodiments, controller 112 may be integrated with one or more other elements of platform 110, for example, or distributed as multiple logic devices within platform 110, base station 130, and/or sensor payload 140.

In some embodiments, controller 112 may be configured to substantially continuously monitor and/or store the status of and/or sensor data provided by one or more elements of platform 110, sensor payload 140, RPDS 160, and/or base station 130, such as the position and/or orientation of platform 110, sensor payload 140, and/or base station 130, for example, and the status of a communication link established between platform 110, sensor payload 140, RPDS 160, and/or base station 130. Such communication links may be configured to be established and then used to transmit data between elements of system 100 substantially continuously throughout operation of system 100, where such data includes various types of sensor data, control parameters, and/or other data.

Orientation sensor 114 may be implemented as one or more of a compass, float, accelerometer, and/or other device capable of measuring an orientation of platform 110 (e.g., magnitude and direction of roll, pitch, and/or yaw, relative to one or more reference orientations such as gravity and/or Magnetic North), optional gimbal system 122, imaging system/sensor payload 140, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of platform 110 and/or other elements of system 100 and providing such measurements as sensor signals and/or data that may be communicated to other devices of system 100 (e.g., user interface 132, controller 112).

GNSS 118 may be implemented according to any global navigation satellite system, including a GPS, GLONASS, and/or Galileo based receiver and/or other device capable of determining absolute and/or relative position of platform 110 (e.g., or an element of platform 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Communications module 120 may be implemented as any wired and/or wireless communications module configured to transmit and receive analog and/or digital signals between elements of system 100. For example, communications module 120 may be configured to receive flight control signals and/or data from base station 130 and provide them to controller 112 and/or propulsion system 124. In other embodiments, communications module 120 may be configured to receive images and/or other sensor information (e.g., visible spectrum and/or infrared still images or video images) from sensor payload 140 and relay the sensor data to controller 112 and/or base station 130. In further embodiments, communications module 120 may be configured to receive sensor information from RPDS 160 and relay the sensor data to controller 112 and/or base station 130. In various embodiments, communications module 120 may be configured to support spread spectrum transmissions, for example, and/or multiple simultaneous communications channels between elements of system 100. Wireless communication links may include one or more analog and/or digital radio communication links, such as WiFi and others, as described herein, and may be direct communication links established between elements of system 100, for example, or may be relayed through one or more wireless relay stations configured to receive and retransmit wireless communications.

In some embodiments, communications module 120 may be configured to monitor the status of a communication link established between platform 110, sensor payload 140, and/or base station 130. Such status information may be provided to controller 112, for example, or transmitted to other elements of system 100 for monitoring, storage, or further processing, as described herein. Communication links established by communication module 120 may be configured to transmit data between elements of system 100 substantially continuously throughout operation of system 100, where such data includes various types of sensor data, control parameters, and/or other data, as described herein.

In some embodiments, when present, optional gimbal system 122 may be implemented as an actuated gimbal mount, for example, that may be controlled by controller 112 to stabilize sensor payload 140 relative to a target or to aim and/or orient sensor payload 140 according to a desired direction and/or relative position. As such, gimbal system 122 may be configured to provide a relative orientation of sensor payload 140 (e.g., relative to an orientation of platform 110) to controller 112 and/or communications module 120 (e.g., gimbal system 122 may include its own orientation sensor 114). In other embodiments, gimbal system 122 may be implemented as a gravity driven mount (e.g., non-actuated). In various embodiments, gimbal system 122 may be configured to provide power, support wired communications, and/or otherwise facilitate operation of articulated sensor/sensor payload 140. In further embodiments, gimbal system 122 may be configured to couple to a laser pointer, range finder, and/or other device, for example, to support, stabilize, power, and/or aim multiple devices (e.g., sensor payload 140 and one or more other devices) substantially simultaneously. In still further embodiments, gimbal system 122 may be implemented as an actuated release mechanism to decouple and/or drop payload 140 according to control signals provided by controller 112 and/or relayed by communications module 120.

Propulsion system 124 may be implemented as one or more propellers, turbines, or other thrust-based propulsion systems, and/or other types of propulsion systems that can be used to provide motive force and/or lift to platform 110 and/or to steer platform 110. In some embodiments, propulsion system 124 may include multiple propellers (e.g., a tri, quad, hex, oct, or other type "copter") that can be controlled (e.g., by controller 112) to provide lift and motion for platform 110 and to provide an orientation for platform 110. In other embodiments, propulsion system 110 may be configured primarily to provide thrust while other structures of platform 110 provide lift, such as in a fixed wing embodiment (e.g., where wings provide the lift) and/or an aerostat embodiment (e.g., balloons, airships, hybrid aerostats). In various embodiments, propulsion system 124 may be implemented with a portable power supply, such as a battery and/or a combustion engine/generator and fuel supply.

Other modules 126 may include other and/or additional sensors, actuators, communications modules/nodes, and/or user interface devices, for example, and may be used to provide additional environmental information related to operation of platform 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), an irradiance detector, and/or other environmental sensors providing measurements and/or other sensor signals that can be displayed to a user and/or used by other devices of system 100 (e.g., controller 112) to provide operational control of platform 110 and/or system 100.

In some embodiments, other modules 126 may include one or more actuated and/or articulated devices (e.g., multi-spectrum active illuminators, visible and/or IR cameras, radars, sonars, and/or other actuated devices) coupled to platform 110, where each actuated device includes one or more actuators adapted to adjust an orientation of the device, relative to platform 110, in response to one or more control signals (e.g., provided by controller 112). In particular, other modules 126 may include a stereo vision system configured to provide image data that may be used to calculate or estimate a position of platform 110, for example, or to calculate or estimate a relative position of a navigational hazard in proximity to platform 110. In various embodiments, controller 130 may be configured to use such proximity and/or position information to help safely pilot platform 110 and/or monitor communication link quality, as described herein.

In various embodiments, RPDS coupler 128 may be implemented as a slot-slide mount, a latching mechanism, and/or other coupler that may be permanently mounted to platform 110 to provide a mounting position and/or orientation for RPDS 160 relative to a center of gravity of platform 110, relative to propulsion system 124, and/or relative to other elements of and/or orientations associated with platform 110. In addition, RPDS coupler 128 may be configured to provide power, support wired communications, and/or otherwise facilitate operation of RPDS 160, as described herein. As such, RPDS coupler 128 may be configured to provide a power, telemetry, and/or other sensor data interface between platform 110 and RPDS 160.

User interface 132 of base station 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communications module 134 of base station 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., visible spectrum and/or infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of platform 110 and/or other elements of system 100. For example, user interface 132 may be adapted to display a time series of positions, headings, and/or orientations of platform 110 and/or other elements of system 100 overlaid on a geographical map, which may include one or more graphs indicating a corresponding time series of actuator control signals, sensor information, and/or other sensor and/or control signals.

In some embodiments, user interface 132 may be adapted to accept user input including a user-defined target heading, waypoint, route, and/or orientation for an element of system 100, for example, and to generate control signals to cause platform 110 to move according to the target heading, route, and/or orientation, or to aim sensor payload 140 accordingly. In other embodiments, user interface 132 may be adapted to accept user input modifying a control loop parameter of controller 112, for example. In further embodiments, user interface 132 may be adapted to accept user input including a user-defined target attitude, orientation, and/or position for an actuated or articulated device (e.g., sensor payload 140) associated with platform 110, for example, and to generate control signals for adjusting an orientation and/or position of the actuated device according to the target attitude, orientation, and/or position. Such control signals may be transmitted to controller 112 (e.g., using communications modules 134 and 120), which may then control platform 110 and/or elements of platform 110 accordingly.

Communications module 134 may be implemented as any wired and/or wireless communications module configured to transmit and receive analog and/or digital signals between elements of system 100. For example, communications module 134 may be configured to transmit flight control signals from user interface 132 to communications module 120 or 144. In other embodiments, communications module 134 may be configured to receive sensor data (e.g., visible spectrum and/or infrared still images or video images, or other sensor data) from sensor payload 140. In some embodiments, communications module 134 may be configured to support spread spectrum transmissions, for example, and/or multiple simultaneous communications channels between elements of system 100. In various embodiments, communications module 134 may be configured to monitor the status of a communication link established between base station 130, sensor payload 140, and/or platform 110 (e.g., including packet loss of transmitted and received data between elements of system 100, such as with digital communication links), as described herein. Such status information may be provided to user interface 132, for example, or transmitted to other elements of system 100 for monitoring, storage, or further processing, as described herein.

Other modules 136 of base station 130 may include other and/or additional sensors, actuators, communications modules/nodes, and/or user interface devices used to provide additional environmental information associated with base station 130, for example. In some embodiments, other modules 136 may include a humidity sensor, a wind and/or water temperature sensor, a barometer, a radar system, a visible spectrum camera, an infrared camera, a GNSS, an analyte sensor system, and/or other environmental sensors providing measurements and/or other sensor signals that can be displayed to a user and/or used by other devices of system 100 (e.g., controller 112) to provide operational control of platform 110 and/or system 100 or to process sensor data to compensate for environmental conditions, such as an water content in the atmosphere approximately at the same altitude and/or within the same area as platform 110 and/or base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by user interface 132).

In embodiments where imaging system/sensor payload 140 is implemented as an imaging device, imaging system/sensor payload 140 may include imaging module 142, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, imaging module 142 may include one or more logic devices (e.g., similar to controller 112) that can be configured to process imagery captured by detector elements of imaging module 142 before providing the imagery to memory 146 or communications module 144. More generally, imaging module 142 may be configured to perform any of the operations or methods described herein, at least in part, or in combination with controller 112 and/or user interface 132.

In some embodiments, sensor payload 140 may be implemented with a second or additional imaging modules similar to imaging module 142, for example, that may include detector elements configured to detect other electromagnetic spectrums, such as visible light, ultraviolet, and/or other electromagnetic spectrums or subsets of such spectrums. In various embodiments, such additional imaging modules may be calibrated or registered to imaging module 142 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

Communications module 144 of sensor payload 140 may be implemented as any wired and/or wireless communications module configured to transmit and receive analog and/or digital signals between elements of system 100. For example, communications module 144 may be configured to transmit infrared images from imaging module 142 to communications module 120 or 134. In other embodiments, communications module 144 may be configured to receive control signals (e.g., control signals directing capture, focus, selective filtering, and/or other operation of sensor payload 140) from controller 112 and/or user interface 132. In some embodiments, communications module 144 may be configured to support spread spectrum transmissions, for example, and/or multiple simultaneous communications channels between elements of system 100. In various embodiments, communications module 144 may be configured to monitor the status of a communication link established between sensor payload 140, base station 130, and/or platform 110 (e.g., including packet loss of transmitted and received data between elements of system 100, such as with digital communication links), as described herein. Such status information may be provided to imaging module 142, for example, or transmitted to other elements of system 100 for monitoring, storage, or further processing, as described herein.

Memory 146 may be implemented as one or more machine readable mediums and/or logic devices configured to store software instructions, sensor signals, control signals, operational parameters, calibration parameters, infrared images, and/or other data facilitating operation of system 100, for example, and provide it to various elements of system 100. Memory 146 may also be implemented, at least in part, as removable memory, such as a secure digital memory card for example including an interface for such memory.

Orientation sensor 148 of sensor payload 140 may be implemented similar to orientation sensor 114 or gyroscope/accelerometer 116, and/or any other device capable of measuring an orientation of sensor payload 140, imaging module 142, and/or other elements of sensor payload 140 (e.g., magnitude and direction of roll, pitch, and/or yaw, relative to one or more reference orientations such as gravity and/or Magnetic North) and providing such measurements as sensor signals that may be communicated to various devices of system 100. Gyroscope/accelerometer (e.g., angular motion sensor) 150 of sensor payload 140 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of sensor payload 140 and/or various elements of sensor payload 140 and providing such measurements as sensor signals that may be communicated to various devices of system 100.

Other modules 152 of sensor payload 140 may include other and/or additional sensors, actuators, communications modules/nodes, cooled or uncooled optical filters, and/or user interface devices used to provide additional environmental information associated with sensor payload 140, for example. In some embodiments, other modules 152 may include a humidity sensor, a wind and/or water temperature sensor, a barometer, a radar system, a visible spectrum camera, an infrared camera, a GNSS, an analyte sensor system, and/or other environmental sensors providing measurements and/or other sensor signals that can be displayed to a user and/or used by imaging module 142 or other devices of system 100 (e.g., controller 112) to provide operational control of platform 110 and/or system 100 or to process imagery to compensate for environmental conditions.

In alternative embodiments, where payload 140 is implemented as a package to be delivered to a target position, location, or destination, gimbal system 122 may be implemented as an actuated payload coupler configured to decouple or release or drop payload 140 (e.g., as controlled by controller 112, user interface 132, and/or other elements of system 100) from platform 110. In related embodiments, RPDS 160 may be coupled to payload 140 (e.g., via a shock cord or other element of RPDS 160) and be configured to deploy canopy assembly 168 to protect payload 140 after it is decoupled from platform 110 (e.g. while in flight) and as it descends from platform 110 to a desired delivery location, as described herein. In such embodiments, RPDS 160 may be referred to as a recovery parachute deployment system.

More generally, as shown in FIG. 1, RPDS 160 may be implemented as a parachute deployment system configured to deploy a canopy assembly 168 configured to reduce and/or arrest undesired momentum of platform 110, such as during and/or to compensate for a navigation crisis, as described herein. For example, in various embodiments, controller 112 and/or other elements of system 100 may be configured to detect unintended inverted flying of platform 110, unsafe attitude excursions of platform 110 (e.g., outside preselected safety ranges), unintended and/or unrecoverable losses of altitude of platform 110, entrance of platform 110 into a restricted altitude or airspace, loss of propulsion or navigation control power for platform 110, loss of communication between platform 110 and base station 110 and/or other UAV navigation crises, for example, and to control RPDS 160 to deploy a rescue parachute (e.g., canopy assembly 164) to cause platform 110 and/or payload 140 to safety descend to the ground without damaging platform 110, payload 140, other elements of system 100, and/or underlying persons or property, as described herein.

In the embodiment shown in FIG. 1, RPDS 160 includes optional deployment controller 162, ejector assembly 164, rotor guard 166, canopy assembly 168, and other modules 170. In various embodiments, rotor guard 166 may be disposed substantially about canopy assembly 168 and ejector assembly 164 may be configured to launch rotor guard 166 and canopy assembly 168 through a rotor plane of propulsion system 124 and/or platform 110. By deploying canopy assembly 168 through a rotor plane of platform 110, RPDS 160 is able to reduce a momentum of platform 110 and/or payload 140 to a relatively safe momentum or associated descent velocity more quickly and at lower deployment altitudes achievable by systems unable to reliably launch through such rotor plane.

As described more fully herein with reference to FIGS. 3A-7C, rotor guard 166 may be implemented by one or more relatively lightweight and rigid shells, cups, lids, frames, and/or rods configured to enclose and protect canopy assembly 168 from rotor impacts as it is launched through a rotor plane of platform 110. Rotor guard 166 may be formed from metal or plastic (e.g., polylactic acid/polylactide (PLA), PET) or combinations of those, for example, and may be manufactured via additive manufacturing (e.g., 3D printing), injection molding, machining, casting, and/or other metal and/or plastic manufacturing techniques. In embodiments where rotor guard 166 is capsule shaped, rotor guard 166 may be formed according to shells, body walls, and/or dome shaped lid thicknesses of approximately 1 mm. Rotor guard 166 may include various vent holes, shock cord orifices, spacer ribs, alignment features, and/or other structures configured to facilitate packaging of canopy assembly 168 and/or launch by ejector assembly 164.

Canopy assembly 168 may include a canopy/parachute shroud, suspension lines, link collectors, swivels, a shock cord, and/or other rescue parachute elements, for example, that can be wrapped and/or folded into a bundle that can be packed within rotor guard 166 and launched by ejector assembly 164. Ejector assembly 164 may include one or more launch impulse generators configured to provide sufficient impulse to rotor guard 166 and/or canopy assembly 168 to launch rotor guard 166 and canopy assembly 168 and reliably deploy canopy assembly 168 through a rotor plane of platform 110.

Optional deployment controller 162 may be configured to receive control signals and/or telemetry from platform 110 (e.g., via communications module 120 and/or RPDS coupler 128), for example, and/or to receive telemetry from sensors integrated with payload 140 (e.g., orientation sensor 148, gyroscope/accelerometer 150, other modules 152) and/or RPDS 160 (e.g., other modules 170), and control operation of ejector assembly 164 based, at least in part, on the received control signals and/or telemetry. In some embodiments, deployment controller 162 may be configured to control operation of ejector assembly 164 independent of control signals and/or telemetry provided by other elements of platform 110, base station 130, and/or system 100.

More generally, deployment controller 162 may be implemented as one or more of any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of RPDS 160 and/or other elements of RPDS 160, for example. Such software instructions may also implement methods for processing sensor signals, determining sensor information, providing user feedback (e.g., through user interface 132 via communications through RPDS coupler 128 and/or communications module 120), querying devices for operational parameters, selecting operational parameters for devices, or performing any of the various operations described herein.

In addition, a non-transitory medium may be provided for storing machine readable instructions for loading into and execution by deployment controller 162, and such non-transitory medium may be implemented as internal and/or external memory and/or associated interfaces. In these and other embodiments, deployment controller 162 may be implemented with other components where appropriate, such as volatile memory, non-volatile memory, one or more interfaces, and/or various analog and/or digital components for interfacing with modules of RPDS 160 and/or devices of system 100. For example, deployment controller 162 may be adapted to store sensor signals, sensor information, parameters for coordinate frame transformations, calibration parameters, sets of calibration points, and/or other operational parameters, over time, for example, and provide such stored data to a user using user interface 132. In some embodiments, deployment controller 162 may be integrated with one or more other elements of RPDS 160, for example, or distributed as multiple logic devices within platform 110, base station 130, and/or RPDS 160.

In some embodiments, controller 112 may be configured to substantially continuously monitor and/or store the status of and/or sensor data provided by one or more elements of RPDS 160, such as the position and/or orientation of platform 110, RPDS 160, and/or base station 130, for example, and the status of a communication link established between platform 110, RPDS 160, and/or base station 130. Such communication links may be configured to be established and then transmit data between elements of system 100 substantially continuously throughout operation of system 100, where such data includes various types of sensor data, control parameters, and/or other data.

Other modules 170 of RPDS 160 may include other and/or additional sensors, actuators, communications modules/nodes, and/or user interface devices used to provide additional operational and/or environmental information associated with RPDS 160, for example. In some embodiments, other modules 170 may include a humidity sensor, a wind and/or water temperature sensor, a barometer, an orientation sensor, a gyroscope/accelerometer, a GNSS, and/or other navigational or environmental sensors providing measurements and/or other sensor signals that can be displayed to a user and/or used by deployment controller 162 or other devices of system 100 (e.g., controller 112) to provide operational control of RPDS 160, platform 110, and/or system 100, as described herein.

In some embodiments, other modules 170 may include a communications module implemented as any wired and/or wireless communications module configured to transmit and receive analog and/or digital signals between elements of system 100. For example, such communications module may be configured to receive control signals (e.g., control signals directing operation of RPDS 160) from controller 112 and/or user interface 132. In some embodiments, such communications module may be configured to support spread spectrum transmissions, for example, and/or multiple simultaneous communications channels between elements of system 100. In other embodiments, other modules 170 may include a power supply implemented as any power storage device configured to provide enough power to each element of RPDS 160 to keep all such elements active and operable while RPDS 160 is otherwise disconnected from external power (e.g., provided by platform 110 and/or base station 130). In various embodiments, such power supply may be implemented by a supercapacitor so as to be relatively lightweight and facilitate flight of platform 110.

Although system 100 is shown in FIG. 1 with a single RPDS 160 coupled to platform 110 through RPDS coupler 128, in other embodiments, system 100 may include multiple RPDSs 160, each of which may be coupled to platform 110 (e.g., to assist in recovery of relatively large and/or heavy embodiments of platform 110) and/or to payload 140 (e.g., though a coupler similar to RPDS coupler 128 but integrated with payload 140). In some embodiments, one RPDS may be configured to assist in recovery of platform 110, and another RPDS may be configured to assist in separate recovery of payload 140, such as after decoupling of payload 140 from platform 110.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for platform 110, using one or more power leads. Such power leads may also be used to support one or more communication techniques between elements of system 100.

Figure 2:
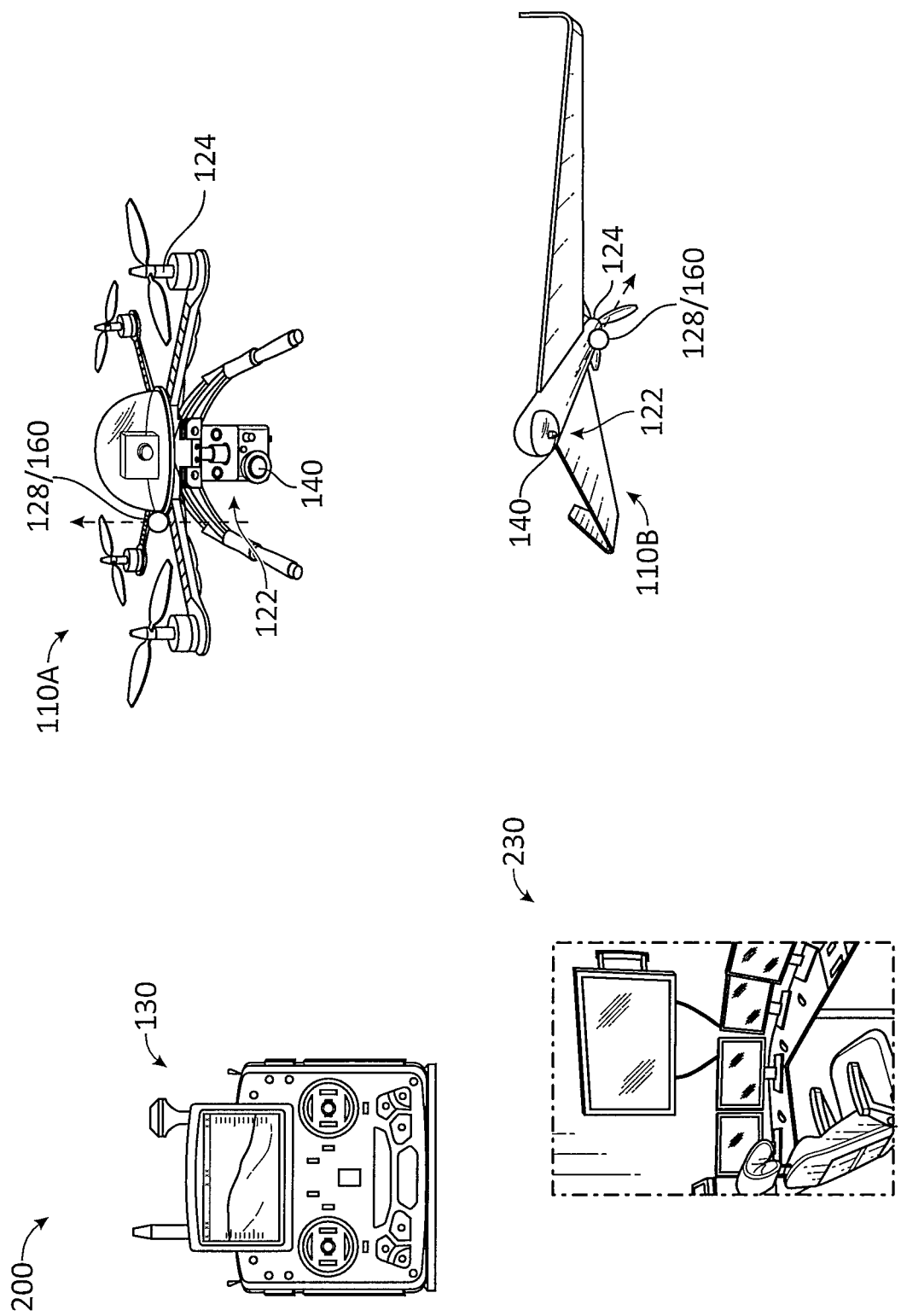
FIG. 2 illustrates a diagram of a UAS including UAVs with rescue parachute deployment systems in accordance with an embodiment of the disclosure.

FIG. 2 illustrates a diagram of mobile platforms/UAVs 110A and 110B of UAS 200 including embodiments of RPDS 160 and associated RPDS coupler 128 in accordance with an embodiment of the disclosure. In the embodiment shown in FIG. 2, UAS 200 includes base station 130, optional co-pilot station 230, mobile platform 110A with articulated imaging system/sensor payload 140, gimbal system 122, RPDS 160, and RPDS coupler 128, and mobile platform 110B with articulated imaging system/sensor payload 140, gimbal system 122, RPDS 160, and RPDS coupler 128, where base station 130 and/or optional co-pilot station 230 may be configured to control motion, position, orientation, and/or general operation of platform 110A, platform 110B, sensor payloads 140, and/or RPDSs 160.

In various embodiments, co-pilot station 230 may be implemented similarly relative to base station 130, such as including similar elements and/or being capable of similar functionality. In some embodiments, co-pilot station 230 may include a number of displays so as to facilitate operation of RPDS 160 and/or various imaging and/or sensor payloads of mobile platforms 110A-B, generally separate from piloting mobile platforms 110A-B, and to facilitate substantially real time analysis, visualization, and communication of sensor data and corresponding directives, such as to first responders in contact with a co-pilot or user of system 200. For example, base station 130 and co-pilot station 230 may each be configured to render any display views described herein.

Also shown in FIG. 2 are dashed arrows extending through RPDSs 160 and oriented perpendicular to the respective rotor planes of platforms 110A and 110B. With respect to 'copter-type UAV/platform 110A, the dashed arrow shows the direction rotor guard 166 and canopy assembly 168 are launched through the rotor plane defined by the multiple and roughly vertically aligned rotors (and their associated rotor disks) of platform 110A. With respect to fixed wing-type UAV/platform 110B, the dashed arrow shows the direction rotor guard 166 and canopy assembly 168 are launched through the rotor plane defined by the single pusher and longitudinally aligned rotor (and its associated rotor disk) of platform 110B.

In particular, each dashed arrow illustrates how embodiments of RPDS 160 are able to reduce/arrest momentum of platforms 110A and 110B more quickly than alternative systems. For example, platform 110A typically flies in the orientation shown in FIG. 2, with each of the rotors aligned substantially vertically, and in the majority of navigation crises, the crisis begins while platform 110A hovers or flies laterally in the shown orientation. As such, launch of canopy assembly 168 vertically along the direction of the dashed arrow, and through the corresponding rotor plane, typically results in the canopy inflating before platform 110A has dropped more than 1-2 body heights in altitude, whereas lateral launch of canopy assembly 168 (or vertical down launch) would typically result in a free-fall drop of 5 or more body heights (e.g., partially dependent upon the length of the shock cord) and potentially in a relatively unstable pendulum swinging of platform 110.

With respect to platform 110B, platform 110B typically flies laterally in the orientation shown in FIG. 2, with its single pusher rotor aligned substantially laterally and substantially opposite the main momentum of platform 110B, and in the majority of its navigation crises, the crisis begins while platform 110B flies laterally in the shown orientation. As such, launch of canopy assembly 168 laterally along the direction of the dashed arrow, and through the corresponding rotor plane, typically results in the canopy inflating before platform 110B has traveled more than 1-2 body lengths, and potentially before platform 110B has dropped in altitude at all, whereas other launch directions would typically either degrade the aerodynamics of platform 110B or risk tangling suspension lines within the pusher rotor, for example, and typically result in platform 110B traveling 5 or more body lengths before slowing. In situations where platform 110B is experiencing a navigation crisis that involves a dive (e.g., where its rotor is aligned substantially vertically), the concerns and benefits illustrated with respect to platform 110A apply.

Figure 3A:
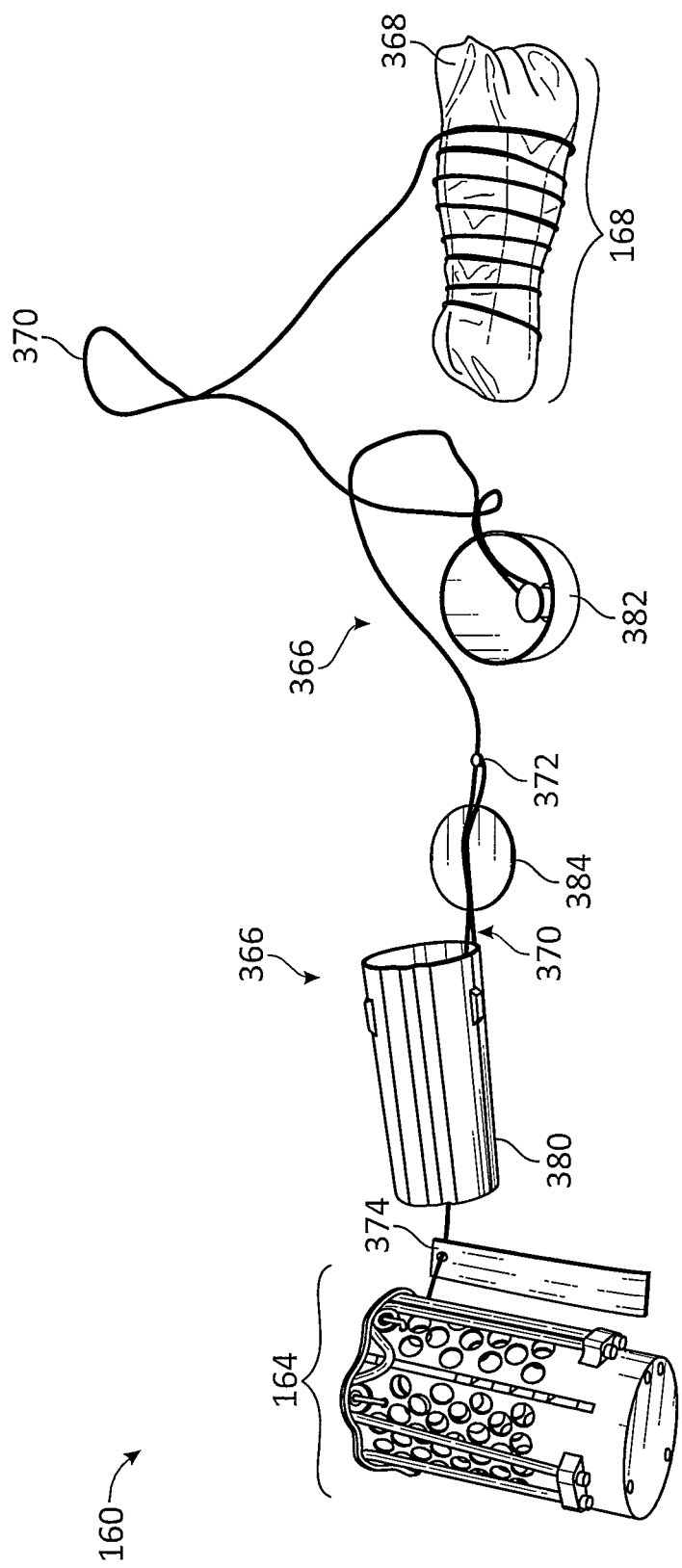
FIG. 3A illustrates a diagram of a UAV rescue parachute deployment system in accordance with an embodiment of the disclosure.

FIG. 3A illustrates a diagram of UAV rescue parachute deployment system 160 in accordance with an embodiment of the disclosure. In FIG. 3A, RPDS 160 includes canopy assembly 168, capsule rotor guard 366, and ejector assembly 164 all secured to each other via a shock cord 370, as shown. In various embodiments, regulations pursuant to UAV flight over people may require that no element of RPDS 160 become loose or free fall during deployment and descent. In such embodiments, shock cord 370 may be coupled to suspension lines of canopy 368, through all elements of rotor guard 166, and to ejector assembly 164 (e.g., or potentially through ejector assembly 164 directly to platform 110 and/or payload 140) to ensure no elements of RPDS 160 free fall after deployment of canopy assembly 168.

In the embodiment shown in FIG. 3A, rotor guard 366 is implemented as a capsule including a tapered rotor guard body or cup 380, a vent hole seal member 384 (e.g., configured to seal vent holes disposed in a base of capsule body 380 against ambient water ingress into rotor guard 366), and a dome shaped lid 382, each of which may be coupled to shock cord 370 such as by threading shock cord 370 through corresponding shock cord orifices and/or knotting shock cord 370 (e.g., to itself or retainer features integrated with the various elements) to limit movement of the various elements along a length of shock cord 370. In some embodiments, RPDS may include a safety flag and/or shock cord coupler 374 disposed adjacent ejector assembly 164 and configured to confirm readiness of RPDS 160 when RPDS is coupled to platform 110.

FIG. 3B illustrates a diagram of UAV rescue parachute deployment system 160 in accordance with an embodiment of the disclosure. In particular, FIG. 3B shows a simulated deployment state of RPDS 360 just before unfurling and inflation of canopy assembly 168 after RPDS is launched vertically by ejector assembly 164. Alternatively, FIG. 3B shows a pre-packing state of RPDS 360 after a portion of shock cord 370 has been wrapped about canopy 368 to help form canopy assembly 168 and after vent hole seal member 384 has been depressed into capsule body 380 and/or adjacent to an internal surface of a base of capsule body 380, prior to packing canopy assembly 168 and portions of shock cord 370 within capsule body 380 and attaching dome shaped lid 382 to capsule body 380 to enclose canopy assembly 168 within rotor guard 366.

FIG. 3C illustrates a diagram of ejector assembly 164 for UAV rescue parachute deployment system 160 in accordance with an embodiment of the disclosure. As shown in FIG. 3C, ejector assembly 164 may be implemented by a cylindrical launch canister 350 configured to provide structural support and/or housing for the various elements of ejector assembly 164, for example, and to provide impulse leverage between one or more impulse generators 354 and a launch platform or plunger 352. For example, in the embodiment depicted by FIG. 3C, impulse generators 354 are implemented by a plurality of impulse linkages or pull-springs (e.g., elastic bands) each fixed adjacent a base of launch canister 350, looped through a lip of launch canister 350, and secured to a one of a plurality of launch impulse interfaces 386 of launch platform 352.

In such embodiments, launch platform 352 may be depressed into launch canister 350—to reposition launch impulse interfaces 386 from proximate a lip of launch canister 350, along interface guides/slots 358, to proximate a base of launch canister 350, in order to stretch impulse linkages 354 (e.g., to prime impulse generators 354). Launch platform 352 and/or launch impulse interfaces 386 may then be secured to an actuated launch release 357 of launch canister 350 to place ejector assembly 164 in a primed state (ejector assembly 164 is in an unprimed or expended state otherwise). After canopy assembly 168 and rotor guard 166 are secured within a primed ejector assembly 168, RPDS 160 is in a primed state (RPDS 160 is in an unprimed or expended state otherwise). Once primed, RPDS 160 may deploy or launch canopy assembly 168 and rotor guard 166 by releasing actuated launch release 357, which causes launch platform 352 and/or launch impulse interfaces 386 to return to the lip of launch canister 350 and provide sufficient momentum to rotor guard 160 and canopy assembly 168 to launch and deploy canopy assembly through a rotor plane of platform 110 reliably and safely.

In alternative embodiments, impulse generator(s) 354 may be implemented by push springs disposed within launch canister 350 and between a base of launch canister 350 and an underside of launch platform 352. In still further embodiments, impulse generator(s) 354 may be implemented by compressed gas capsules and/or other impulse generators configured to elevate launch platform 352 from a primed position adjacent the base of launch canister 350 towards a lip of launch canister 350. In various embodiments, launch canister 350 may also provide structural support and/or housing for deployment controller 162, external memory interface 362, wired communications interface 361, and/or any other elements of RPDS 160 (e.g., including other modules 170), which may be disposed adjacent to and/or integrated with a base of launch canister 350, as shown.

Figure 6A:
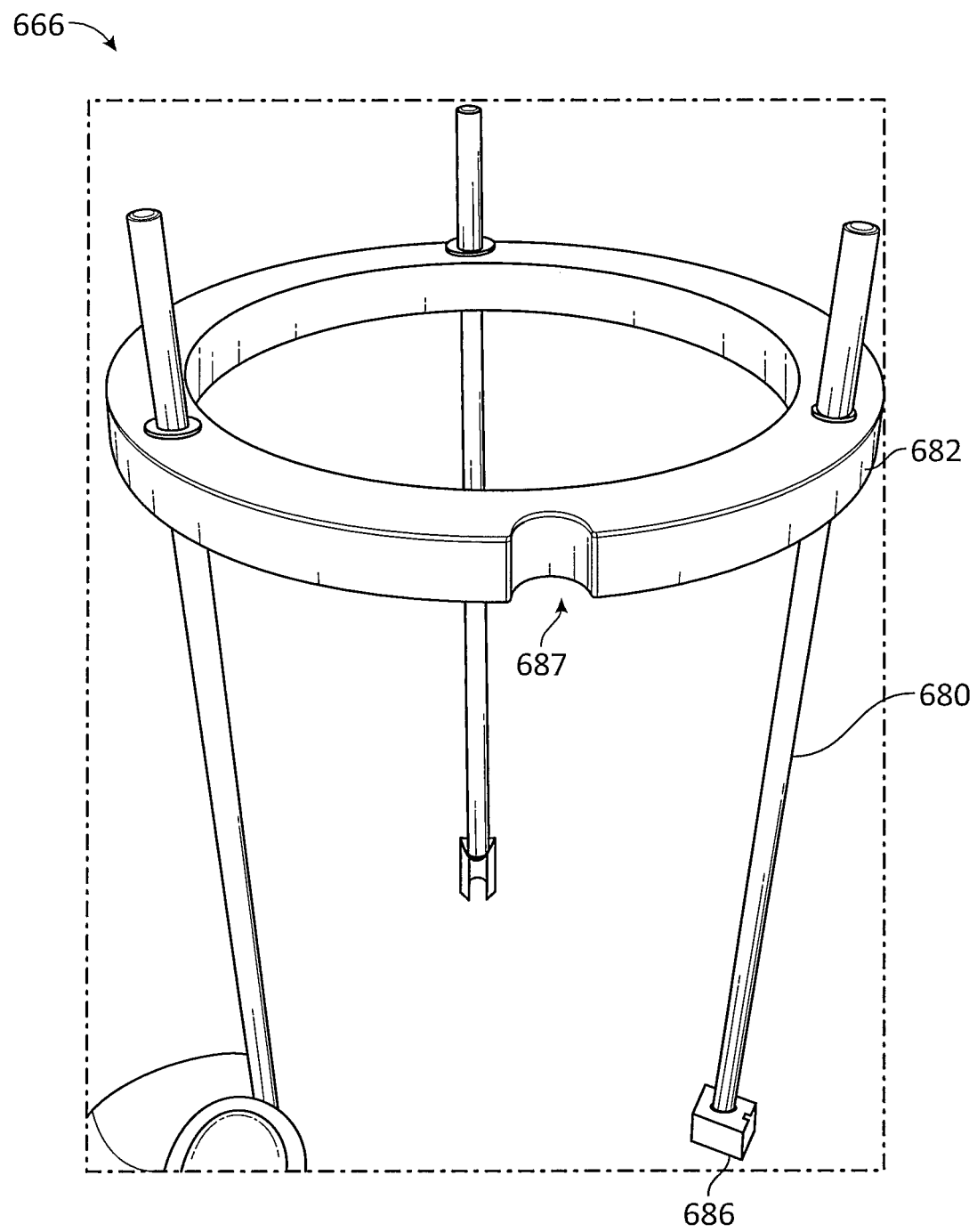
FIG. 6A illustrates a diagram of a rotor guard for a UAV rescue parachute deployment system in accordance with an embodiment of the disclosure.
Figure 6E:
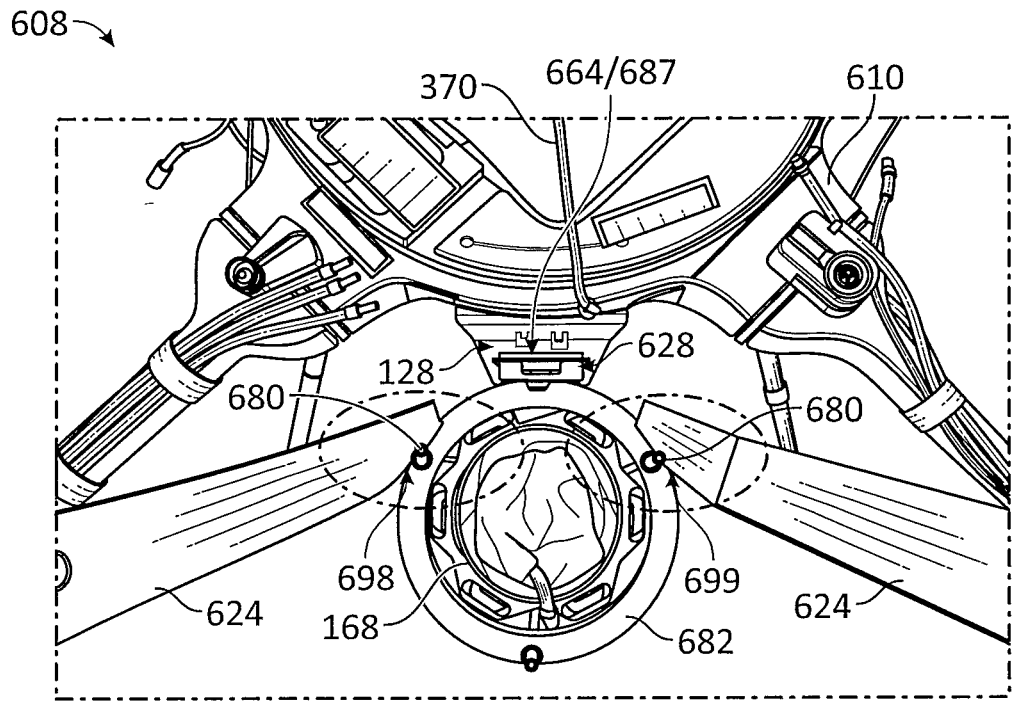
FIGS. 6E-F illustrate diagrams of a UAV rescue parachute deployment system employing the rotor guard of FIG. 6A, as installed on a UAV, in accordance with embodiments of the disclosure.
Figure 6F:
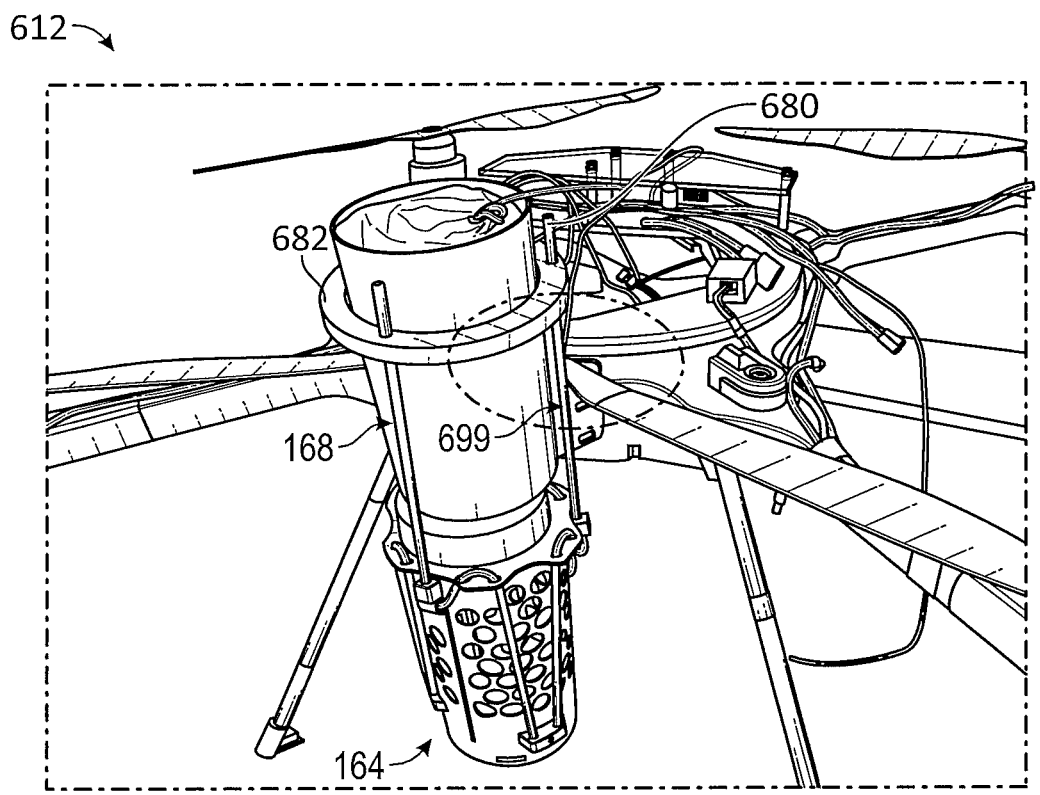
Figure 7C:
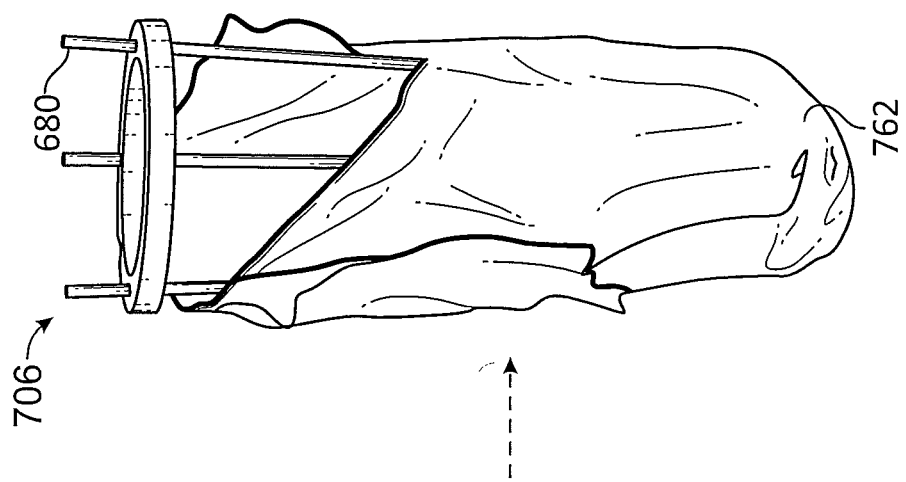
FIGS. 7A-C illustrate diagrams of a UAV rescue parachute deployment system in accordance with an embodiment of the disclosure.

FIGS. 4A-7C illustrate various structurally differentiated embodiments of rotor guard 166. In particular, FIGS. 4A-5C depict embodiments of capsule-shaped rotor guards (e.g., rotor guards 466 and 566), and FIGS. 6-7C depict embodiments of rotor guard frames (e.g., rotor guard 666). Each rotor guard embodiment was filmed using a high speed camera (e.g., 2000 fps) during deployment through a rotor plane under variable conditions, including stationary rotors with blades disposed directly above launch canister 350 and impeding deployment of canopy assembly 168, residually rotating rotors (e.g., rotating at approximately 200 rpm, which is typical when rotors are deenergized just before deploying canopy assembly 168), and fully powered rotating rotors (e.g., rotating at approximately 3000 RPM, which can happen if deployment of canopy assembly 168 occurs without deenergizing the rotor beforehand). Under all conditions, all rotor blade hits were absorbed by the various embodiments of rotor guard 166, and canopy assembly 168 was undamaged and able to unfold and inflate.

Figure 4B:
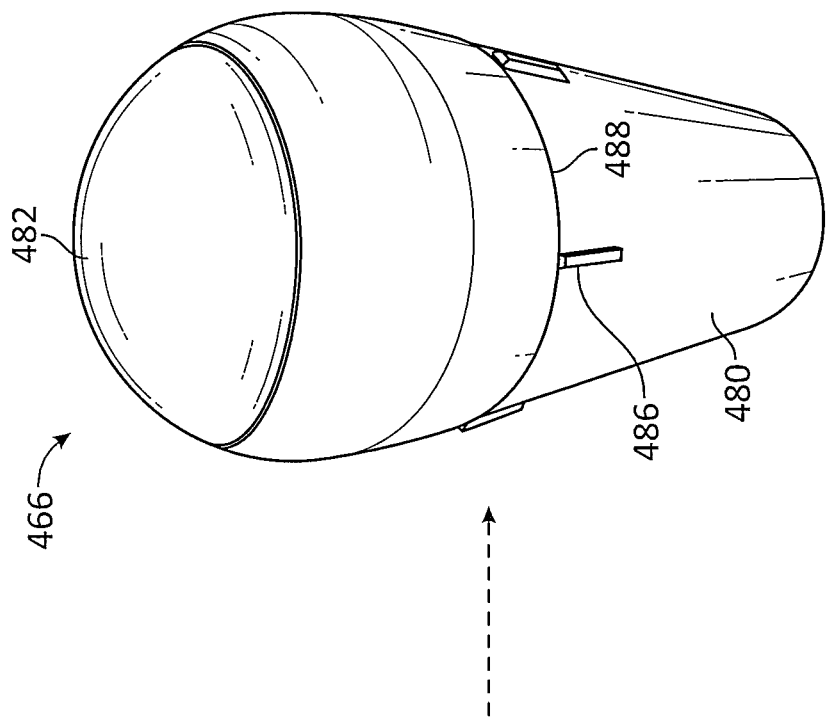
FIGS. 4A-B illustrate diagrams of a rotor guard for a UAV rescue parachute deployment system in accordance with embodiments of the disclosure.
Figure 4A:
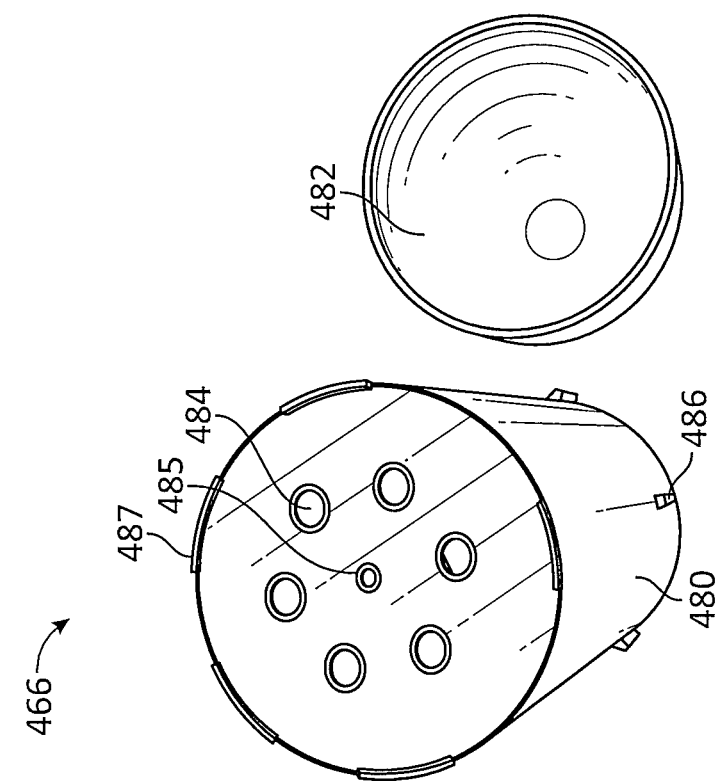

FIGS. 4A-B illustrate diagrams of a capsule-shaped rotor guard 466 for UAV rescue parachute deployment system 160 in accordance with embodiments of the disclosure. In some embodiments, rotor guard 466 may be implemented similar to and/or share features of capsule-shaped rotor guard 366 of FIGS. 3A-B. In particular, rotor guard 466 may be implemented as a relatively rigid capsule including: vent holes for vacuum relief during parachute deployment; various ribs and/or other features to space and/or align rotor guard 466 from/to launch canister 350 (e.g., to protect from ice formation in narrow gaps); a tapered body shape for reliable rotor guard ejection/launch; and one or more beads of silicon grease to seal rotor guard 466 from water ingress, as described herein. In general, capsule-shaped rotor guard 466 may be deployed by ejector assembly 164 via launch platform 352 engaging with a base of rotor guard 466 and forcing rotor guard 466 out of launch canister 350 as launch platform 352 is elevated away from the base of launch canister 350 and towards a lip of launch canister 350 (e.g., by impulse generator 354).

As shown in FIG. 4A, capsule-shaped rotor guard 466 may be implemented by a tapered cylindrical rotor guard body 480 and a dome shaped lid 482 configured to couple to rotor guard body 480 and form capsule-shaped rotor guard 466. Rotor guard body 480 may include spacer ribs 486 distributed about a cylindrical wall of rotor guard body 480 to provide spacing from and/or alignment with an interior of launch canister 350, for example, and/or arcuate spacer ribs 487 distributed about a base edge of rotor guard body 480 to provide spacing from and/or alignment with a base and/or orientation of launch canister 350. In some embodiments, rotor guard body 480 may include one or more vent holes 484 in the base of rotor guard body 480 to provide air ingress into rotor guard body 480 and/or rotor guard 466 (e.g., to provide vacuum relief to the interior of the capsule) and to allow dome shaped lid 482 and/or canopy assembly 168 to escape rotor guard body 480 during deployment of canopy assembly 168. In related embodiments, rotor guard body 480 may include a shock cord orifice 485 in the base of rotor guard body 480 that is configured to pass through at least a portion of shock cord 370 and secure rotor guard body 480 to shock cord 370 to prevent it from becoming decoupled from platform 110 after deployment of canopy assembly 168. A similar shock cord orifice may be formed at the apex of dome shaped lid 482. As part of assembly of rotor guard 466, and after dome shaped lid 482 is engaged with rotor guard body 480 (e.g., to encapsulate canopy assembly 168), a silicon grease bead 488 may be formed about the seam between dome shaped lid 482 and rotor guard body 480 to seal rotor guard 466 against moisture ingress, as shown.

FIG. 5A illustrates a diagram of a capsule-shaped rotor guard 566 for UAV rescue parachute deployment system 160 in accordance with an embodiment of the disclosure. In particular, rotor guard 566 may be implemented as a relatively rigid capsule including interlocking halves with a vertical parting line and a shock cord orifice for shock cord 370 and/or an associated parachute harness disposed along the vertical parting line, as shown. Rotor guard 566 may also include any of the various elements and/or characteristics described with reference to capsule shaped rotor guard 466 of FIGS. 4A-B.

As shown in FIG. 5A, capsule-shaped rotor guard 566 may be implemented by first and second cylindrical domed half-shell bodies 580 and 582 configured to interlock with each other to form capsule-shaped rotor guard 566. In various embodiments, each domed half-shell body 580 and 582 may include one or more shell body interlocks 584 configured to secure the half-cylindrical body portions of each domed half-shell body to each other, and a base lip 586 disposed along a base edge of the domed half-shell body. Each base lip 586 may include a base interlock 585 disposed at either end that is configured to interlock the bases and/or base lips of each domed half-shell body to each other, as shown. In addition, each base lip 586 may include one or more base lip supports/angles 587 configured to provide structural rigidity to each base lip 586. Such base lip supports/angles 587 may also provide for formation of various alignment features for alignment within launch canister 350 and/or to launch platform 352, as described herein. In the embodiment presented by FIG. 5A, each domed half-shell body 580 and 582 includes a portion of a shock cord orifice 588 disposed along the vertical split-shell seam between the two bodies and substantially above or adjoining a top of shell body interlocks 584.

FIGS. 5B-C illustrate diagrams of rotor guard 566 of FIG. 5A disposed about a canopy assembly 168 for UAV rescue parachute deployment system 160 in accordance with embodiments of the disclosure. In particular, FIGS. 5B-C illustrate two assembly states 502 and 504 in preparation of loading rotor guard 566 into a primed or unprimed ejector assembly 168. In assembly state 502 of FIG. 5B, canopy 368 is folded, wrapped, and/or rolled together with suspension lines 369 to form canopy assembly 168, which is placed within one domed half-shell body 580, and shock cord 370 is fed through shock cord orifice 588. In assembly state 504 of FIG. 5C, domed half-shell body 582 is interlocked with domed half-shell body 580 to enclose/encapsulate canopy assembly 168 with shock cord 370 extending through shock cord orifice 588, which is disposed along split-shell seam 581 as shown. In some embodiments, rotor guard 566 may include one or more alignment features/notches 587 (e.g., corresponding to base lip supports/angles 587 shown in FIG. 5A) configured to rotationally align rotor guard 566 within launch canister 350 (e.g., to ensure shock cord orifice 588 and/or shock cord 370 is disposed at a desired position relative to platform 110 and/or RPDS coupler 128 when RPDS 160 is in a primed state/during flight of platform 110). In various embodiments, when assembled, rotor guard 566 may be capsule shaped with a tapered body (e.g., narrower at a base of rotor guard 566), similar to rotor guard 466 of FIGS. 4A-B.

FIG. 6A illustrates a diagram of a rotor guard frame 666 for UAV rescue parachute deployment system 160 in accordance with an embodiment of the disclosure. In particular, rotor guard 666 may be implemented as a relatively rigid outer guard frame structure including several pushrods each coupled to corresponding launch impulse interfaces 386 of launch platform 352, for example, and coupled to each other via a ring frame. During deployment of canopy assembly 168, the pushrods and ring frame move together with launch impulse interfaces 386 of launch platform 352. The pushrods can absorb rotor impacts, particularly when structurally stabilized by the ring frame, which may be coupled to and disposed near the top of the pushrods to form the rigid outer guard frame structure. The arrangement of ring frame and pushrods provides structural rigidity and prevents rotor guard 666 from bending and jamming during deployment and/or possible rotor impacts during deployment. Rotor guard 666 may in some embodiments include various elements and/or characteristics described with reference to capsule shaped rotor guards 466 and/or 566 of FIGS. 4A-5C.

As shown in FIG. 6A, rotor guard frame 666 may be implemented by a plurality of pushrods 680 (e.g., rotor guard rods) coupled together by a ring frame 682 to form a roughly tapered cylindrical rotor guard frame, as shown. Such rotor guard frame may be sized to encompass and/or be disposed about canopy assembly 168, also as shown. In some embodiments, each pushrod 680 may include an ejector assembly interface 686 disposed at a lower end and configured to engage with launch impulse interfaces 386 and/or launch platform 352 and elevate rotor guard frame 666 out of launch canister 350 during deployment of canopy assembly 168. Each pushrod 680 may also be sized to have a length greater than a height of canopy assembly 168 (as bundled for insertion into ejector assembly 164), such that the top of each pushrod 680 extends above a top surface of ring frame 682. In general, the number and arrangement (e.g., relative positioning) of pushrods 680 within ring frame 682 may be determined based on the expected rotor impact points along a periphery of rotor guard 666 and/or canopy assembly 168 during flight of platform 110, for example, so as to limit the weight of rotor guard 666. In some embodiments, such relative positioning (e.g., relative to the expected rotor impact points) may be ensured by rotationally aligning rotor guard 666 within ejector assembly 164 via one or more alignment features/notches 687 formed along an outer edge of ring frame 682.

In various embodiments, each pushrod 680 may be glued, welded, and/or otherwise affixed to ring frame 682 disposed about a circumference of ring frame 682 and oriented roughly parallel to a symmetry axis of ring frame 682, such as to form a cylindrical rotor guard frame, for example, which may in some embodiments be tapered at its base to facilitate loading and launching of rotor guard 666 and canopy assembly 168. In some embodiments, each pushrod 680 may be affixed within holes formed through and roughly perpendicular to a characteristic plane of ring frame 682 (e.g., a characteristic plane perpendicular to the central symmetry axis of ring frame 682). In some embodiments, ring frame 682 may be roughly toroidal, for example, and may include a rectangular or square cross section, as shown in FIG. 6A.

FIGS. 6B-D illustrate diagrams of UAV rescue parachute deployment system 160 employing rotor guard 666 of FIG. 6A, in accordance with embodiments of the disclosure. In particular, FIGS. 6B-D illustrate three assembly states 602, 604, and 606 associated with loading rotor guard 666 into ejector assembly 168 and/or priming ejector assembly 168 and/or RPDS 160. In assembly state 602 of FIG. 6B, canopy 368 is folded, wrapped, and/or rolled together with suspension lines 369 to form canopy assembly 168, which may be placed within and/or include a tapered canopy shroud 668 (e.g., a tapered open cylinder of plastic wrapping film), and fed into rotor guard 666 such that canopy assembly 168 and/or canopy shroud 668 contacts an inner surface of ring frame 682 (e.g., which may prevent canopy assembly 168 and/or canopy shroud 668 from unraveling during loading into ejector assembly 164). Each ejector assembly interface 686 of pushrods 680 may be positioned to engage with corresponding launch impulse interfaces 386, and shock cord 370 may be wrapped within and/or draped off to the side of canopy assembly 168, as shown.

In assembly state 604 of FIG. 6C, rotor guard 666 is inserted into ejector assembly 164 such that launch platform 352 and launch impulse interfaces 386 are depressed into launch canister 350 by pushrods 680 via ejector assembly interface 686 of pushrods 680. In assembly state 606 of FIG. 6C, rotor guard 666 is fully loaded into ejector assembly 164 such that launch platform 352 and/or launch impulse interfaces 386 are engaged with actuated launch release 357 of launch canister 350, ejector assembly 164 is in a primed state, and RPDS 160 is in a primed state. In some embodiments, ring frame 682 may be adjoining a top lip of launch canister 350 when RPDS 160 is in such primed state, as shown.

FIGS. 6E-F illustrate diagrams of UAV rescue parachute deployment system 160 employing rotor guard 666 of FIG. 6A, as installed on UAV 110, in accordance with embodiments of the disclosure. In particular, FIGS. 6E-F illustrate two deployment states 608 and 612 associated with deploying rotor guard 666 and canopy assembly 168 by ejector assembly 168 through a rotor plane of platform 110. In deployment state 608 of FIG. 6E, canopy assembly 168 and rotor guard 666 (e.g., pushrods 680 and ring frame 682) of RPDS 160 are partially deployed into a rotor frame of platform 110. Ejector assembly 164 of RPDS 160 is coupled to airframe 610 of platform 110 via RPDS coupler 128 (e.g., a slide and slot coupler mechanism), and rotor guard 666 is rotationally aligned within ejector assembly 164 and/or relative to an orientation of airframe 610 of platform 110 via ejection assembly alignment latch 664 configured to fit within and/or align with alignment notch 687 formed in ring frame 682 of ring guard 666.

As can be seen in FIG. 6E, ring frame 682 is just below rotor blades 624, and rotor blades 624 are impacting pushrods 680 at rotor impact points 698 and 699. As such, pushrods 680 have been positioned to absorb rotor impacts without allowing rotor blades 624 to contact canopy assembly 168 (e.g., while rotor blades 624 are rotating in their expected directions). Shock cord 370 is draped out of view for illustrative purposes but is shown attached both to canopy assembly 168 and airframe 610 of platform 110. In deployment state 612 of FIG. 6F, canopy assembly 168 and rotor guard 666 (e.g., pushrods 680 and ring frame 682) of RPDS 160 are fully deployed into a rotor frame of platform 110, such that contact point 699 between rotor blade 624 and pushrod 680 is below ring frame 682, and canopy assembly 168 is protected from rotor impacts as it is deployed through the rotor plane of platform 110.

As can be seen from FIGS. 6A-F, canopy assembly 168 is not packed into a sealed container. In some embodiments, RPDS 160 may be protected from water ingress and UV radiation by a single-use weather pouch configured to enclose and seal at least a portion of RPDS 160 against such environmental conditions. For example, the tops of pushrods 680 of rotor guard 666 may be configured to tear through, open, and/or otherwise unseal the weather pouch during deployment of rotor guard 666 and provide an egress for the deployment of canopy assembly 168 through the rotor plane of UAV/platform 110.

Figure 7B:
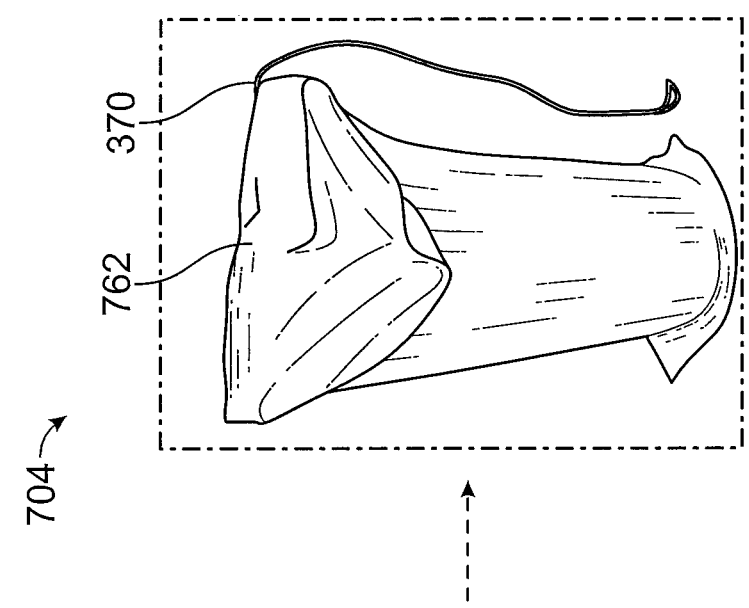
Figure 7A:
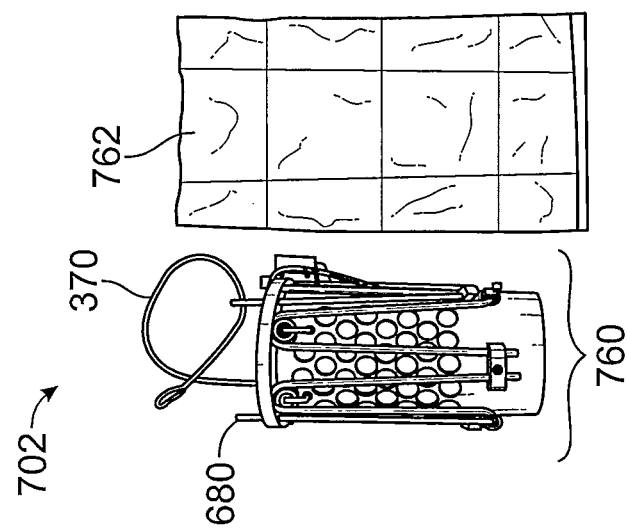

FIGS. 7A-C illustrate diagrams of UAV rescue parachute deployment system 160 utilizing a weather pouch to protect elements of RPDS 160 from environmental conditions in accordance with an embodiment of the disclosure. In particular, FIGS. 7A-C illustrate three operational states 702, 704, and 706 associated with packaging rotor guard 666 and canopy assembly 168 within a weather pouch and deploying rotor guard 666 and canopy assembly 168 via RPDS 160. In operational state 702 of FIG. 7A, primed RPDS 760 with pushrods 680 of rotor guard 666 extending from a top of RPDS 760 is positioned adjacent to an unsealed and open weather pouch 762. In various embodiments, weather pouch 762 may be single use or disposable, for example, and may be formed from a relatively thin strong and flexible material, such as metallized mylar with an integrated thermal seal layer, for example, or other polymeric material films, such as vapor metalized polyethylene terephthalate (PET) films—MPET/PET.

In operational state 704 of FIG. 7B, primed RPDS 760 placed and sealed within weather pouch 762 such that shock cord 370 extends from the sealed end of weather pouch 762. In such operational state, primed RPDS 760 may be coupled to platform 110 via RPDS coupler 128 without breaking the seal of weather pouch 762 through use of a slide and slot latching mechanism that allows the relatively thin wall of weather pouch 762 to conform to and/or integrate with the slide and slot latching mechanism (e.g., as shown in FIG. 6E). Shock cord 370 may be coupled to RPDS coupler 128, for example, or elsewhere to airframe 610 of platform 110.

In operational state 706 of FIG. 7C, RPDS 160 has deployed canopy assembly 168 and rotor guard 666, where tops of pushrods 680 of rotor guard 666 have torn, opened, or otherwise unsealed weather pouch 762 and launched canopy assembly 168 out of weather pouch 762 through a rotor plane of platform 110, as described herein. In some embodiments, rotor guard 666 may be configured to elevate and stop with launch impulse interfaces 386 and/or launch platform 352 due to ejector assembly interfaces 686 of pushrods 680 being securely coupled to launch impulse interfaces 386, as shown in FIGS. 6B-D. After launch impulse interfaces 386 and/or launch platform 352 reach the end of their elevation travel, canopy assembly 168 may continue along its launch motion due to the momentum imparted to it by ejector assembly 164, as described herein.

Figure 8:
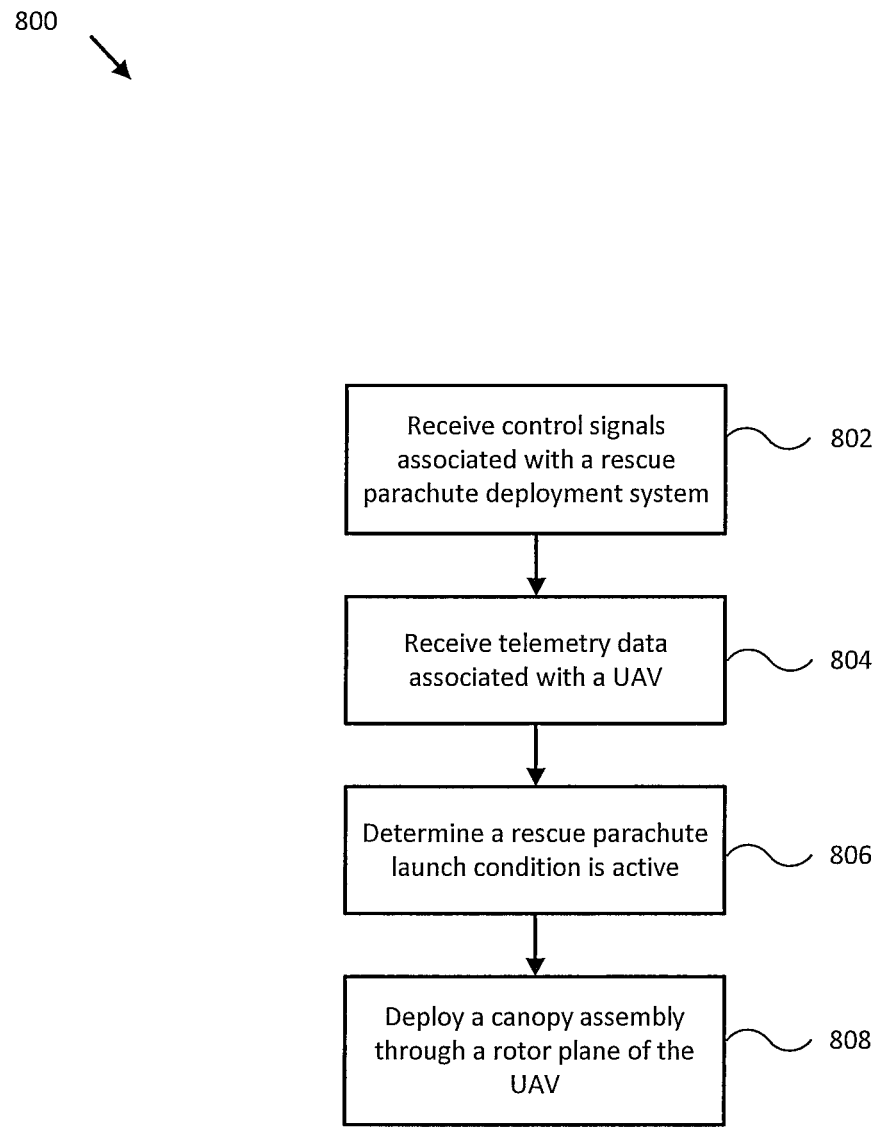
FIG. 8 illustrates a flow diagram of various operations to operate a UAV rescue parachute deployment system in accordance with an embodiment of the disclosure.

FIG. 8 illustrates a flow diagram 800 of various operations to operate UAV rescue parachute deployment system 160 in accordance with an embodiment of the disclosure. In some embodiments, the operations of FIG. 8 may be implemented as software instructions executed by one or more logic devices or controllers associated with corresponding electronic devices, sensors, and/or structures depicted in FIGS. 1-7C. More generally, the operations of FIG. 8 may be implemented with any combination of software instructions, mechanical elements, and/or electronic hardware (e.g., inductors, capacitors, amplifiers, actuators, or other analog and/or digital components). Any step, sub-step, sub-process, or block of process 800 may be performed in an order or arrangement different from the embodiment illustrated by FIG. 8. For example, in other embodiments, one or more blocks may be omitted from or added to process 800. Furthermore, block inputs, block outputs, various sensor signals, sensor information, calibration parameters, and/or other operational parameters may be stored to one or more memories prior to moving to a following portion of a corresponding process. Although process 800 is described with reference to systems described in FIGS. 1-7C, process 800 may be performed by other systems different from those systems and including a different selection of electronic devices, sensors, assemblies, mechanisms, platforms, and/or platform attributes.

At block 802, control signals associated with an RPDS are received. For example, controller 112, deployment controller 162, and/or communications module 120 may be configured to receive control signals associated with RPDS 160, such as control signals generated by controller 112, user interface 132, and/or communication module 132. In some embodiments, such control signals may include an RPDS arm signal, for example, where RPDS 160 is disabled until such RPDS arm signal is received and/or generated by one or more elements of system 100. Such control signals may also include a rescue parachute launch signal generated by UAV 110 and/or base station 130, for example, such as after detection of a navigation crisis, as described herein, or affirmatively via user input provided to user interface 132 of base station 130 (e.g., a user manual deployment signal or a mission abort signal). In additional embodiments, such control signals may include a payload release signal generated by UAV 110 and/or base station 130, for example, such as after determining UAV 110 has reached a delivery location, as described herein, or affirmatively via user input provided to user interface 132 of base station 130 (e.g., a payload drop signal).

At block 804, telemetry data associated with a UAV is received. For example, controller 112, deployment controller 162, and/or communications module 120 may be configured to receive telemetry data associated with RPDS 160 and/or UAV 110 from one or more telemetry sensors coupled to and/or integrated with RPDS 160 and/or UAV 110. In various embodiments, such telemetry sensors may include any of the orientation, position, motion, imagery, environmental, and/or other navigational sensors coupled to and/or integrated with elements of system 100, for example, and such telemetry data may include their associated sensor data, as described herein.

In block 806, a rescue parachute launch condition is determined as active. For example, controller 112 and/or deployment controller 162 may be configured to determine a rescue parachute launch condition is active based, at least in part, on the control signals and/or telemetry data received in blocks 802 and/or 804. In one embodiment, controller 112 and/or deployment controller 162 may be configured to determine a rescue parachute launch condition is active when a UAV navigation crisis exists. For example, controller 112 and/or deployment controller 162 may be configured to determine a navigation crisis exists based, at least in part, on the telemetry data received in block 804.

Such UAV navigation crisis may include one or more of: unintended inverted flying of UAV 110, attitude excursions of UAV 110 outside preselected safety attitude ranges (e.g., maximum attitude angles and/or angle rates—such as entering unrecoverable pitches or rolls/tilts—supplied as user input to base station 130 prior to mission deployment), unintended and/or otherwise unrecoverable losses of altitude of UAV 110 (e.g., where the rate of loss of altitude exceeds the maneuvering capability of propulsion system 124 and/or UAV 110), entrance of UAV 110 into a restricted altitude or airspace (e.g., related to geo-fencing and/or public safety, such as regulatory unmanned flight restrictions associated with airports), loss of propulsion or navigation control power for UAV 110, free fall of UAV 110, loss of communication between UAV 110 and base station 130 associated with UAV 110, and/or other use-case or application specific telemetry events. Such application specific telemetry events may include failure of UAV 110 to reach a designated location at a designated time, failure of UAV 110 to traverse a designated route or portion of a designated route within a designated time period, detection of a particular environmental condition (e.g., precipitation) about UAV 110, environmental conditions about UAV 110 exceeding a maneuvering capability of UAV 110, physical damage to propulsion system 124 and/or UAV 110, and/or proximity of UAV 110 to a static or mobile structure (e.g., a building or another manned or unmanned aircraft), for example.

In another embodiment, controller 112 and/or deployment controller 162 may be configured to determine a rescue parachute launch condition is active when a rescue parachute launch signal and/or a payload release signal (e.g., when shock cord 370 is coupled to payload 140 of UAV 110) is generated and/or received, as described herein.

In block 808, a canopy assembly is deployed through a rotor plane of a UAV. For example, controller 112 and/or deployment controller 162 may be configured to control actuated launch release 357 integrated with ejector assembly 164 of RPDS 160 to deploy rotor guard 166 into and canopy assembly 168 through a rotor plane of UAV 110 by releasing launch platform 352 and/or launch impulse interfaces 386 and/or activating impulse generator(s) 354 to generate a launch impulse to deploy rotor guard 166 and canopy assembly 168, as described herein.

In some embodiments, controller 112 and/or deployment controller 162 may be configured to generate and/or provide a control signal to propulsion system 124 of UAV 110 to deenergize propulsion system 124 before launching/deploying rotor guard 160 and canopy assembly 168. In related embodiments, controller 112 and/or deployment controller 162 may be configured to generate and/or provide a control signal to propulsion system 124 to stop and/or brake all rotors powered by and/or otherwise associated with propulsion system 124. In other embodiments, controller 112 and/or deployment controller 162 may be configured to control a payload coupler of UAV 110 (e.g., an embodiment of gimbal system 122) to release payload 140 from UAV 110 prior to controlling ejector assembly 164 to deploy canopy assembly 168 through the rotor plane of UAV 110, as described herein.

In additional embodiments, before, during, or after deploying rotor guard 160 and canopy assembly 168, system 100 may be configured to sound/energize an audio alarm, which may be coupled to UAV 110 and/or RPDS 160 (e.g., other modules 126 and/or 170) and/or integrated with base station 130 (e.g., user interface 132 and/or other modules 136), for example, and/or to light and/or flash safety LEDs mounted to UAV 110 and/or RPDS 160 (e.g., other modules 126 and/or 170) and/or integrated with base station 130 (e.g., user interface 132 and/or other modules 136).

In some embodiments, controller 112 and/or deployment controller 162 may be configured to detect that UAV 110 is inverted (e.g., pitch and/or roll less than negative ninety [−90] degrees) and either delay deployment of rotor guard 166 and/or canopy assembly 168 until UAV is not inverted (e.g., pitch and/or roll equal to or greater than negative ninety [−90] degrees), for example, or control propulsion system 124 to attempt to right UAV 110, prior to reaching a minimum deployment altitude, under which rotor guard 166 and/or canopy assembly 168 will be deployed regardless of an inverted/non-inverted state of UAV 110.

By providing such systems and techniques for UAV rescue parachute deployment, embodiments of the present disclosure substantially improve the operational flexibility and reliability of unmanned flight platforms. Moreover, such systems and techniques may be used to increase the operational safety of unmanned flight platforms beyond that achievable by conventional systems. As such, embodiments provide UAV rescue parachute deployment systems with significantly increased convenience and performance.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. An unmanned aerial vehicle (UAV) comprising at least one rotor and a rescue parachute deployment system (RPDS), the RPDS comprising:
a canopy assembly comprising a bundled canopy configured to be coupled to the UAV or a payload of the UAV via a shock cord and a plurality of suspension lines;
a rotor guard disposed at least partially about the canopy assembly and configured to protect the canopy assembly from rotor strike damage as the canopy assembly is launched through at least one rotor disk of the UAV, each rotor disk being an area swept by at least one rotor of the UAV; and
an ejector assembly comprising a launch platform and/or a plurality of launch impulse interfaces configured to deploy the rotor guard into and the canopy assembly through the at least one rotor disk of the UAV.

2. The UAV of claim 1, wherein the rotor guard comprises:
a tapered cylindrical rotor guard body comprising one or more spacer ribs, vent holes, shock cord orifices, and/or alignment features; and
a dome shaped lid configured to couple to the tapered cylindrical rotor guard body and form a capsule-shaped rotor guard.

3. The UAV of claim 1, wherein the rotor guard comprises:
first and second cylindrical domed half-shell bodies configured to interlock with each other to form a capsule-shaped rotor guard, wherein each cylindrical domed half-shell body comprises one or more of a shell body interlock, a base interlock, a base lip, a base lip support, and/or an alignment feature.

4. The UAV of claim 1, wherein the RPDS is mounted beneath the at least one rotor disk, the RPDS further comprising:
a logic device coupled to and/or integrated with the ejector assembly or the UAV, wherein the logic device is configured to:
determine a rescue parachute launch condition is active; and
control the ejector assembly to deploy the canopy assembly through the at least one rotor disk of the UAV.

5. The UAV of claim 4, wherein the RPDS is mounted beneath a field of view of an antenna of the UAV, and
to determine the rescue parachute launch condition is active, the logic device is configured to:
receive a rescue parachute launch signal from the UAV and/or a base station associated with the UAV.

6. The UAV of claim 4, wherein to determine the rescue parachute launch condition is active, the logic device is configured to:
receive telemetry data associated with the RPDS and/or the UAV from at least one telemetry sensor coupled to and/or integrated with the ejector assembly or the UAV; and
determine a UAV navigation crisis exists based, at least in part, on the received telemetry data.

7. The UAV of claim 6, wherein the UAV navigation crisis comprises one or more of:
unintended inverted flying of the UAV, attitude excursions of the UAV outside preselected safety attitude ranges, unintended and/or otherwise unrecoverable losses of altitude of the UAV, entrance of the UAV into a restricted altitude or airspace, loss of propulsion or navigation control power for the UAV, free fall of the UAV, or loss of communication between the UAV and a base station associated with the UAV.

8. The UAV of claim 4, wherein:
the shock cord is coupled to a payload of the UAV;
the determining the rescue parachute launch condition is active comprises receiving a payload release signal from the UAV and/or a base station associated with the UAV; and
the logic device is configured to control a payload coupler of the UAV to release the payload from the UAV prior to the controlling the ejector assembly to deploy the canopy assembly through the at least one rotor disk of the UAV.

9. The UAV of claim 4, wherein to control the ejector assembly to launch the canopy assembly through the at least one rotor disk of the UAV, the logic device is configured to:

provide a control signal to the UAV to deenergize a propulsion system for the UAV before launching the canopy assembly through the at least one rotor disk of the UAV; and/or provide a control signal to light and/or flash safety LEDs mounted to the UAV and/or the RPDS and/or to energize an audio alarm coupled to the UAV or the RPDS or integrated with a base station associated with the UAV.

10. A rescue parachute deployment system (RPDS) for an unmanned aerial vehicle (UAV), the RPDS comprising:
 a canopy assembly comprising a bundled canopy configured to be coupled to the UAV or a payload of the UAV via a shock cord and a plurality of suspension lines;
 a rotor guard disposed at least partially about the canopy assembly and configured to protect the canopy assembly from rotor strike damage as the canopy assembly is launched through at least one rotor disk of the UAV, each rotor disk being an area swept by at least one rotor of the UAV; and
 an ejector assembly comprising a launch platform and/or a plurality of launch impulse interfaces configured to deploy the rotor guard into and the canopy assembly through the at least one rotor disk of the UAV;
 wherein the rotor guard comprises:
  a plurality of pushrods each comprising an ejector assembly interface disposed at one end and a length greater than a height of the canopy assembly; and
  a ring frame coupled to the plurality of pushrods so as to form a tapered cylindrical rotor guard frame disposed about the canopy assembly, wherein a top of each pushrod extends above a top surface of the ring frame.

11. The RPDS of claim 10, further comprising:
 a weather pouch configured to enclose and seal at least a portion of the RPDS against environmental conditions including water ingress and/or UAV radiation; and
 the top of each pushrod is configured to tear through, open, and/or otherwise unseal the weather pouch during deployment of the rotor guard and provide an egress for the deployment of the canopy assembly through the at least one rotor disk of the UAV.

12. A method comprising:
 determining a rescue parachute launch condition for an unmanned aerial vehicle (UAV) is active; and
 controlling an ejector assembly of a rescue parachute deployment system (RPDS) coupled to the UAV to deploy a rotor guard into and a canopy assembly through at least one rotor disk of the UAV, each rotor disk being an area swept by at least one rotor of the UAV, wherein:
  the canopy assembly comprises a bundled canopy coupled to the UAV or a payload of the UAV via a shock cord and a plurality of suspension lines; and
  the rotor guard is disposed at least partially about the canopy assembly and configured to protect the canopy assembly from rotor strike damage as the canopy assembly is launched through the at least one rotor disk of the UAV.

13. The method of claim 12, wherein the RPDS is mounted beneath the at least one rotor disk, and
 the determining the rescue parachute launch condition is active comprises:
 receiving a rescue parachute launch signal from the UAV and/or a base station associated with the UAV.

14. The method of claim 12, wherein the RPDS is mounted beneath a field of view of an antenna of the UAV, and
 the determining the rescue parachute launch condition is active comprises:
 receiving telemetry data associated with the RPDS and/or the UAV from at least one telemetry sensor coupled to and/or integrated with the ejector assembly or the UAV; and
 determining a UAV navigation crisis exists based, at least in part, on the received telemetry data.

15. The method of claim 12, wherein:
 the shock cord is coupled to a payload of the UAV;
 the determining the rescue parachute launch condition is active comprises receiving a payload release signal from the UAV and/or a base station associated with the UAV; and
 method comprises controlling a payload coupler of the UAV to release the payload from the UAV prior to the controlling the ejector assembly to deploy the canopy assembly through the at least one rotor disk of the UAV.

16. The method of claim 12, wherein the controlling the ejector assembly to launch the canopy assembly through the at least one rotor disk of the UAV comprises:
 providing a control signal to the UAV to deenergize a propulsion system for the UAV before launching the canopy assembly through the at least one rotor disk of the UAV; and/or
 providing a control signal to light and/or flash safety LEDs mounted to the UAV and/or the RPDS and/or to energize an audio alarm coupled to the UAV or the RPDS or integrated with a base station associated with the UAV.

17. The method of claim 12, wherein the rotor guard comprises:
 a plurality of pushrods each comprising an ejector assembly interface disposed at one end and a length greater than a height of the canopy assembly; and
 a ring frame coupled to the plurality of pushrods so as to form a tapered cylindrical rotor guard frame disposed about the canopy assembly, wherein a top of each pushrod extends above a top surface of the ring frame.

18. The method of claim 17, wherein the RPDS comprises:
 a weather pouch configured to enclose and seal at least a portion of the RPDS against environmental conditions including water ingress and/or UAV radiation; and
 the top of each pushrod is configured to tear through, open, and/or otherwise unseal the weather pouch during deployment of the rotor guard and provide an egress for the deployment of the canopy assembly through the at least one rotor disk of the UAV.

19. The method of claim 12, wherein the rotor guard comprises:
 a tapered cylindrical rotor guard body comprising one or more spacer ribs, vent holes, shock cord orifices, and/or alignment features; and
 a dome shaped lid configured to couple to the tapered cylindrical rotor guard body and form a capsule-shaped rotor guard.

20. The method of claim 12, wherein the rotor guard comprises:
 first and second cylindrical domed half-shell bodies configured to interlock with each other to form a capsule-shaped rotor guard, wherein each cylindrical domed half-shell body comprises one or more of a shell body interlock, a base interlock, a base lip, a base lip support, and/or an alignment feature.

\* \* \* \* \*